United States Patent
Node et al.

(10) Patent No.: US 8,068,672 B2
(45) Date of Patent: *Nov. 29, 2011

(54) IMAGE PROCESSING APPARATUS AND METHOD, DATA RECORDING MEDIUM, PROGRAM RECORDING MEDIUM, AND PROGRAM THEREFOR

(75) Inventors: Yasunobu Node, Tokyo (JP); Tetsujiro Kondo, Tokyo (JP); Kazutaka Ando, Kanagawa (JP); Kel Hiraizumi, Kanagawa (JP); Michimasa Obana, Tokyo (JP); Masanori Machimura, Tokyo (JP); Masato Akao, Kanagawa (JP)

(73) Assignee: Sony Corporation, Tokyo (JP)

( * ) Notice: Subject to any disclaimer, the term of this patent is extended or adjusted under 35 U.S.C. 154(b) by 1117 days.

This patent is subject to a terminal disclaimer.

(21) Appl. No.: 11/676,833

(22) Filed: Feb. 20, 2007

(65) Prior Publication Data

US 2007/0201769 A1    Aug. 30, 2007

(30) Foreign Application Priority Data

Feb. 28, 2006 (JP) ................................ 2006-052645

(51) Int. Cl.
*G06K 9/46* (2006.01)
*G06K 9/66* (2006.01)
(52) U.S. Cl. .................. 382/190; 382/276; 382/309
(58) Field of Classification Search ............. 348/240.99; 382/190; 386/4, 52, 69, 95, 96
See application file for complete search history.

(56) References Cited

U.S. PATENT DOCUMENTS

| | | | |
|---|---|---|---|
| 5,543,925 A | 8/1996 | Timmermans | |
| 6,400,890 B1* | 6/2002 | Nagasaka et al. | 386/241 |
| 6,704,029 B1* | 3/2004 | Ikeda et al. | 715/723 |
| 7,254,311 B2* | 8/2007 | Nagasaka et al. | 386/69 |
| 2002/0018135 A1* | 2/2002 | Amano | 348/333.01 |
| 2002/0044691 A1* | 4/2002 | Matsugu | 382/218 |
| 2004/0070685 A1 | 4/2004 | Kondo et al. | |
| 2005/0084244 A1* | 4/2005 | Murabayashi | 386/95 |
| 2005/0174451 A1* | 8/2005 | Nozaki et al. | 348/240.99 |
| 2005/0262446 A1 | 11/2005 | Roh | |

FOREIGN PATENT DOCUMENTS

| | | |
|---|---|---|
| EP | 1 686 788 A2 | 8/2006 |
| JP | 9-270006 | 10/1997 |
| JP | 10-320400 | 12/1998 |
| JP | 2002-354406 | 12/2002 |
| JP | 2003-202944 | 7/2003 |
| JP | 2003-339010 | 11/2003 |
| JP | 2007-27880 | 2/2007 |
| WO | WO 00/05718 | 2/2000 |

OTHER PUBLICATIONS

U.S. Appl. No. 11/909,587, filed Sep. 21, 2007, Kondo, et al.
U.S. Appl. No. 11/800,803, filed May 7, 2007.
U.S. Appl. No. 11/675,309, filed Feb. 15, 2007, Ando, et al.

(Continued)

*Primary Examiner* — Gregory M Desire
(74) *Attorney, Agent, or Firm* — Oblon, Spivak, McClelland, Maier & Neustadt, L.L.P.

(57) ABSTRACT

An image processing apparatus includes a feature value extractor configured to extract a feature value from an image; a setting unit configured to set setting information for applying a process to the image; and a recorder configured to record the setting information in association with the feature value of the image in a data recording medium.

14 Claims, 27 Drawing Sheets

OTHER PUBLICATIONS

U.S. Appl. No. 11/677,223, filed Feb. 21, 2007, Obana, et al.
Office Action issued Aug. 3, 2010, in Japan Patent Application No. 2006-052645.

Office Action issued Oct. 12, 2010, in Japanese Patent Application No. 2006-052645.

* cited by examiner

FIG. 20

| FEATURE VALUE | SETTING INFORMATION |
|---|---|
| 00011100 | 2× ZOOM |
| 00011101 | 3× ZOOM |
| 00011010 | 4× ZOOM |
| 01011101 | 5× ZOOM |
| 00110100 | 6× ZOOM |
| 00110110 | 7× ZOOM |
| 10011010 | 8× ZOOM |
| 01011101 | 9× ZOOM |
| 00100100 | |
| 00110110 | |
| 10011010 | 7× ZOOM |
| 01011101 | 6× ZOOM |

IMAGE PROCESSING APPARATUS AND METHOD, DATA RECORDING MEDIUM, PROGRAM RECORDING MEDIUM, AND PROGRAM THEREFOR

CROSS REFERENCES TO RELATED APPLICATIONS

The present invention contains subject matter related to Japanese Patent Application JP 2006-052645 filed in the Japanese Patent Office on Feb. 28, 2006, the entire contents of which are incorporated herein by reference.

BACKGROUND OF THE INVENTION

1. Field of the Invention

The present invention relates to image processing apparatuses and methods, data recording media, program recording media, and programs therefor. In particular, the present invention relates to an image processing apparatus and method for applying a process to an image every time the image is played back and reproducing the processed image by storing the process to be applied to the image and a feature value of the image in association with each other, a data recording medium, a program recording medium, and a program therefor.

2. Description of the Related Art

Techniques for easily processing images are becoming common.

One of the most common techniques for editing an image captured with a video camera or the like is known as linear editing. Linear editing applies various processes to the image while playing back the original image data and records the result of the process or the processed image in another recording medium.

When the original image data is labeled "copy once", it is not allowed with the above-described linear editing to play back and edit the image recorded in a video cassette recorder (VCR) and then to record the edited image.

To solve such a problem, a method of storing an operation specifying a process of editing an image is proposed in Japanese Unexamined Patent Application Publication No. 2003-202944.

SUMMARY OF THE INVENTION

Linear editing can edit an image in accordance with a corresponding time code indicating the time of the image by simultaneously communicating the image and the time code. However, the time code is included inside a consumer VCR, and it is practically difficult to communicate the time code to the outside. An image is not synchronized with an operation specifying a process of editing the image. Therefore, when such an operation is simply stored, it is difficult to apply the process to the image in precise synchronization with playback of the image.

It is desirable to accurately apply a process to an image every time the image is played back and to reproduce the processed image, without applying the process to the original image data, by storing the process to be applied to the image and a feature value of the image in association with each other.

An image processing apparatus according to a first embodiment of the present invention includes the following elements: feature-value extracting means for extracting a feature value from an image; setting means for setting setting information for applying a process to the image; and recording means for recording the setting information in association with the feature value of the image in a data recording medium.

The feature-value extracting means may extract a sum of pixel values of pixels within a predetermined region included in the image as the feature value.

The image processing apparatus may further include operation means for performing an operation specifying the process to be applied to the image. The setting means may set the setting information for applying the process to the image on the basis of details of the operation of the operation means. The recording means may record the details of the operation in association with the feature value of the image in the data recording medium.

When the details of the operation of the operation means specifying the process to be applied to the image are to specify a relative process with respect to the immediately preceding process applied to the image, the recording means may record, in association with the feature value of the image, the details of the operation and setting information based on the immediately preceding process in the data recording medium.

The recording means may record the feature value of the image at a first address in the data recording medium and the setting information at a second address associated with the first address.

The recording means may record a table in which the feature value of the image is associated with the setting information in the data recording medium.

An image processing method according to the first embodiment of the present invention includes the steps of: extracting a feature value from an image; setting setting information for applying a process to the image; and recording the setting information in association with the feature value of the image in a data recording medium.

A program recording medium according to the first embodiment of the present invention has recorded therein a program including the steps of: extracting a feature value from an image; setting setting information for applying a process to the image; and recording the setting information in association with the feature value of the image in a data recording medium.

A program according to the first embodiment of the present invention allows a computer to execute a process including the steps of: extracting a feature value from an image; setting setting information for applying a process to the image; and recording the setting information in association with the feature value of the image in a data recording medium.

A data recording medium according to a second embodiment of the present invention includes a data structure in which setting information for applying a process to an image is recorded in association with a feature value of the image.

The data recording medium may be a removable medium.

An image processing apparatus according to a third embodiment of the present invention includes the following elements: playback-position feature-value extracting means for extracting a feature value at a playback position as a playback-position feature value from an image at the playback position; synchronizing means for synchronizing, with the playback-position feature value, a feature value in a data recording medium in which setting information for applying a process to the image is recorded in association with the feature value of the image; reading means for reading, when the feature value in the data recording medium is synchronized with the playback-position feature value by the synchronizing means, setting information recorded in association with the synchronized playback-position feature value from the data recording medium; and reflecting means for reflecting the process applied to the image at the playback position on the basis of the setting information read by the reading means.

The synchronizing means may include the following elements: search-position feature-value extracting means for sequentially extracting, from the data recording medium in which the setting information for applying the process to the image is recorded in association with the feature value of the image, the feature value as a search-position feature value; and comparing means for sequentially comparing the playback-position feature value with the search-position feature value. When a comparison result shows that the playback-position feature value matches the search-position feature value, it may be regarded that the feature value in the data recording medium in which the setting information for applying the process to the image is recorded in association with the feature value of the image is synchronized with the playback-position feature value.

An image processing method according to the third embodiment of the present invention includes the steps of: extracting a feature value at a playback position as a playback-position feature value from an image at the playback position; synchronizing, with the playback-position feature value, a feature value in a data recording medium in which setting information for applying a process to the image is recorded in association with the feature value of the image; reading, when the feature value in the data recording medium is synchronized with the playback-position feature value, setting information recorded in association with the synchronized playback-position feature value from the data recording medium; and reflecting the process applied to the image at the playback position on the basis of the read setting information.

A program recording medium according to the third embodiment of the present invention has recorded therein a program including the steps of: extracting a feature value at a playback position as a playback-position feature value from an image at the playback position; synchronizing, with the playback-position feature value, a feature value in a data recording medium in which setting information for applying a process to the image is recorded in association with the feature value of the image; reading, when the feature value in the data recording medium is synchronized with the playback-position feature value, setting information recorded in association with the synchronized playback-position feature value from the data recording medium; and reflecting the process applied to the image at the playback position on the basis of the read setting information.

A program according to the third embodiment of the present invention allows a computer to execute a process including the steps of: extracting a feature value at a playback position as a playback-position feature value from an image at the playback position; synchronizing, with the playback-position feature value, a feature value in a data recording medium in which setting information for applying a process to the image is recorded in association with the feature value of the image; reading, when the feature value in the data recording medium is synchronized with the playback-position feature value, setting information recorded in association with the synchronized playback-position feature value from the data recording medium; and reflecting the process applied to the image at the playback position on the basis of the read setting information.

According to the image processing apparatus and method and the program therefor of the first embodiment of the present invention, a feature value is extracted from an image; setting information for applying a process to the image is set; and the setting information is recorded in association with the feature value of the image in a data recording medium.

According to the data recording medium of the second embodiment of the present invention, the data recording medium includes a data structure in which setting information for applying a process to an image is recorded in association with a feature value of the image.

According to the image processing apparatus and method and the program therefor of the third embodiment of the present invention, a feature value at a playback position is extracted as a playback-position feature value from an image at the playback position; a feature value in a data recording medium in which setting information for applying a process to the image is recorded in association with the feature value of the image is synchronized with the playback-position feature value; when the feature value in the data recording medium is synchronized with the playback-position feature value by the synchronizing means, setting information recorded in association with the synchronized playback-position feature value is read from the data recording medium; and the process is reflected in the image at the playback position on the basis of the setting information read by the reading means.

The image processing apparatus according to the embodiments of the present invention may be an independent apparatus or a block configured to perform an image processing process.

According to the first embodiment of the present invention, a predetermined process can be accurately applied to an image to reproduce the processed image without applying the process to the original image data.

According to the first embodiment of the present invention, setting information for processing an image can be recorded in association with a feature value of the image.

According to the second embodiment of the present invention, every time an image is played back, a predetermined process can be accurately applied to the image, and the processed image can be reproduced, without applying the process to the original image data.

According to the second embodiment of the present invention, setting information for processing an image can be recorded in association with a feature value of the image without recording the result of processing the image.

According to the third embodiment of the present invention, a predetermined process can be accurately applied to an image to reproduce the processed image without applying the process to the original image data. Even in the case of image data that is prohibited from being copied, the same process can be applied to the image every time the image is played back and the image can be repeatedly played back.

According to the third embodiment of the present invention, setting information for processing an image is read in association with a feature value of the image, and a process to be applied to the image can be reflected on the basis of the setting information.

BRIEF DESCRIPTION OF THE DRAWINGS

FIG. 20 is a diagram of the image processing process performed by the image processing apparatus shown in FIG. 18;

DESCRIPTION OF THE PREFERRED EMBODIMENTS

Before describing an embodiment of the present invention, the correspondence between the features of the claims and the specific elements disclosed in an embodiment of the present invention is discussed below. This description is intended to assure that an embodiment supporting the claimed invention is described in this specification. Thus, even if an element in the following embodiment is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the embodiments of the invention disclosed in the embodiment are described in the claims. That is, the description does not deny the existence of embodiments of the present invention that are described in the embodiment but not claimed in the invention of this application, i.e., the existence of embodiments of the present invention that in future may be claimed by a divisional application, or that may be additionally claimed through amendments.

Figure 3:
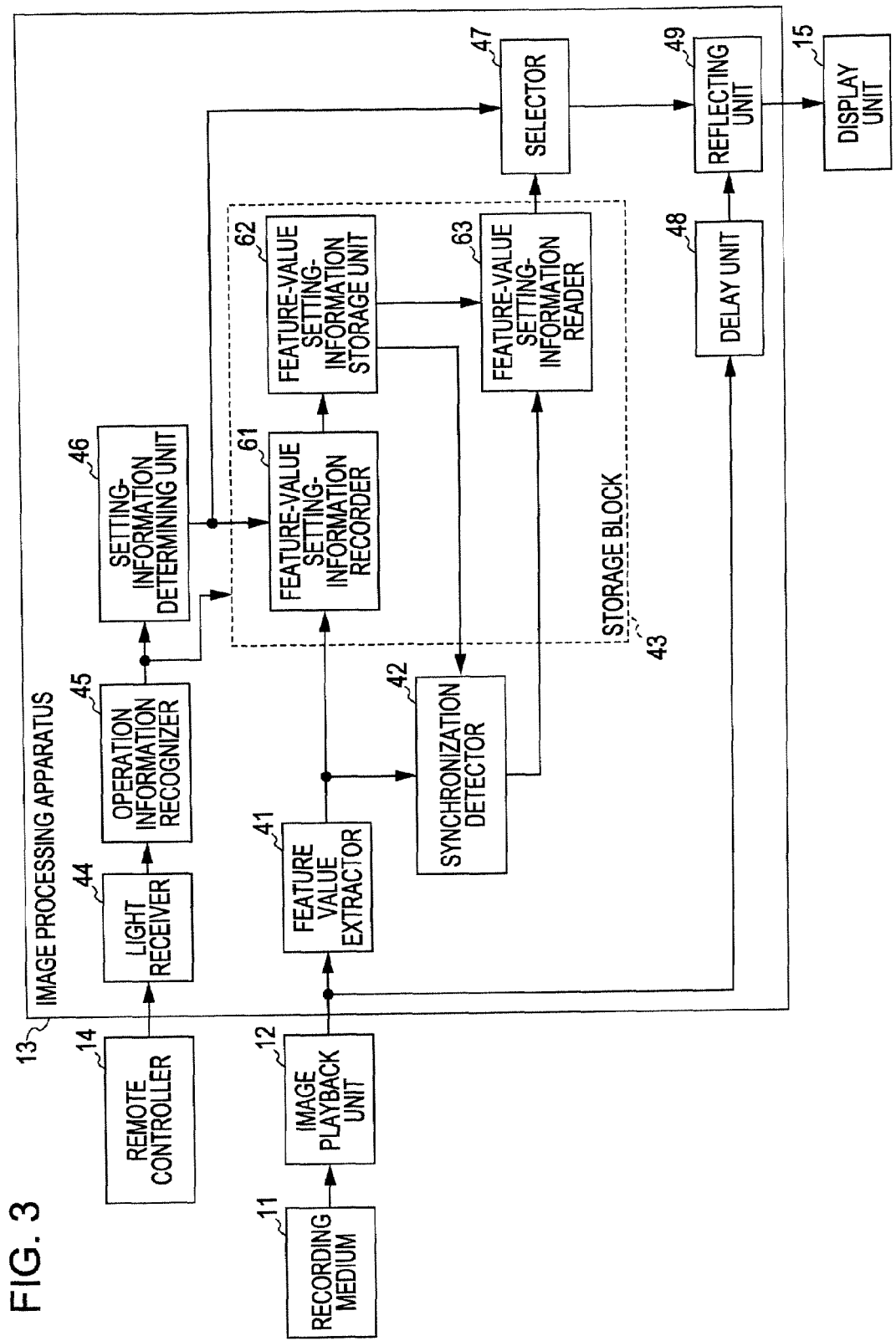
FIG. 3 is a block diagram of the structure of an image processing apparatus according to an embodiment of the present invention.

That is, an image processing apparatus according to a first embodiment of the present invention includes feature-value extracting means (e.g., a feature value extractor 41 shown in FIG. 3) for extracting a feature value from an image, setting means (e.g., a setting-information determining unit 46 shown in FIG. 3) for setting setting information for applying a process to the image; and recording means (e.g., a feature-value setting-information recorder 61 shown in FIG. 3) for recording the setting information in association with the feature value of the image in a data recording medium (e.g., a feature-value setting-information storage unit 62 shown in FIG. 3).

The feature-value extracting means (e.g., the feature value extractor 41 shown in FIG. 3) may extract, as the feature value, the sum of pixel values of pixels within a predetermined region included in the image.

The image processing apparatus may further include operation means (e.g., a remote controller 14 shown in FIG. 13) for performing an operation specifying the process to be applied to the image. The setting means (e.g., the setting-information determining unit 153 shown in FIG. 13) may set the setting information for applying the process to the image on the basis of the details of the operation of the operation means. The recording means (e.g., a feature-value operation-information recorder 161 shown in FIG. 13) may record the details of the operation in association with the feature value of the image in the data recording medium (e.g., a feature-value operation-information storage unit 162 shown in FIG. 13).

Figure 15:
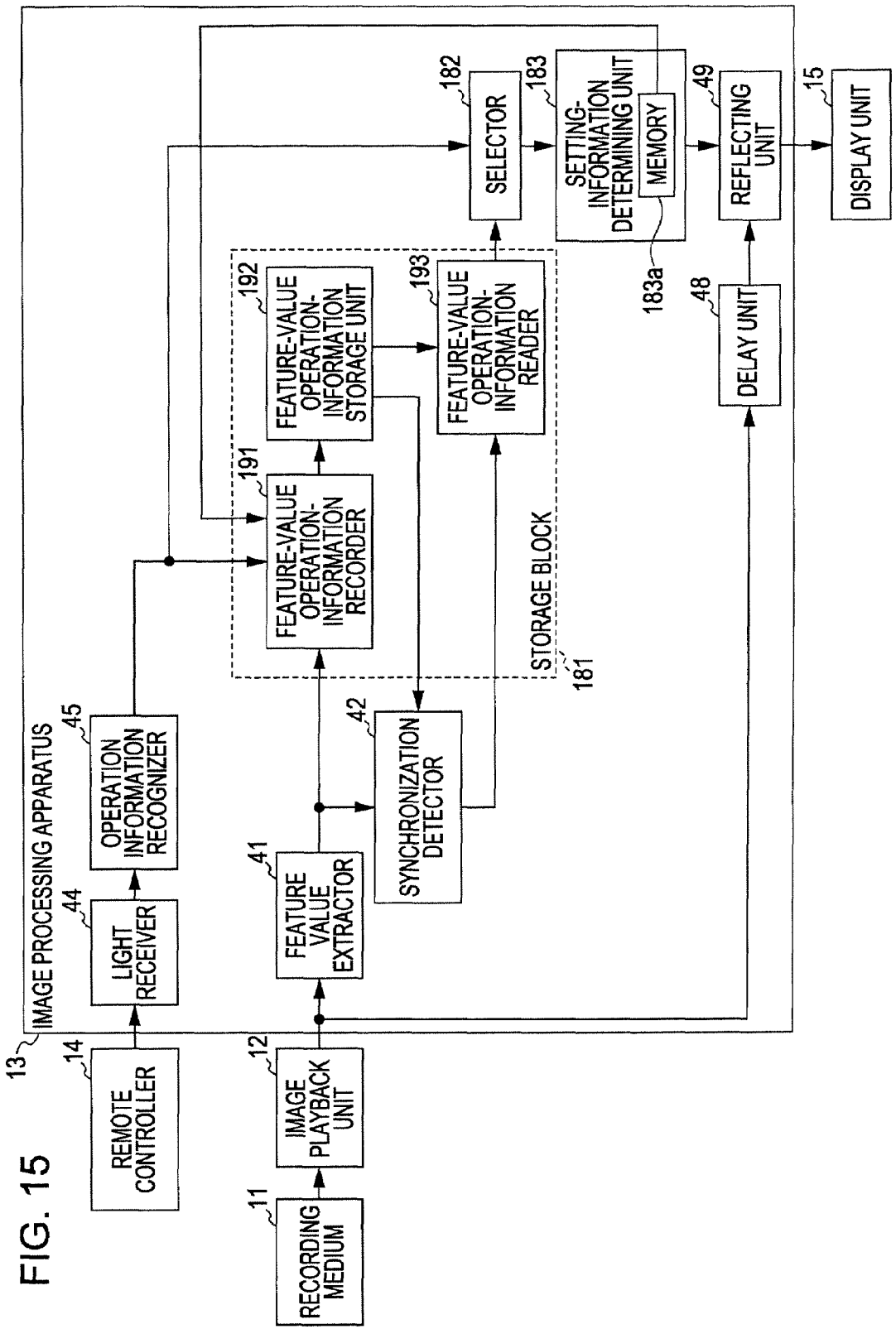
FIG. 15 is a block diagram of yet another exemplary structure of the image processing apparatus according to the embodiment of the present invention.

When the details of the operation of the operation means specifying the process to be applied to the image are to specify a relative process with respect to the immediately preceding process applied to the image, the recording means (e.g., a feature-value operation-information recorder 191 shown in FIG. 15) may record the details of the operation and setting information based on the immediately preceding process in association with the feature value of the image in the data recording medium (e.g., a feature-value operation-information storage unit 192 shown in FIG. 15).

The recording means (e.g., the feature-value setting-information recorder 61 shown in FIG. 3) may record the feature value of the image at a first address in the data recording medium and the setting information at a second address associated with the first address.

Figure 18:
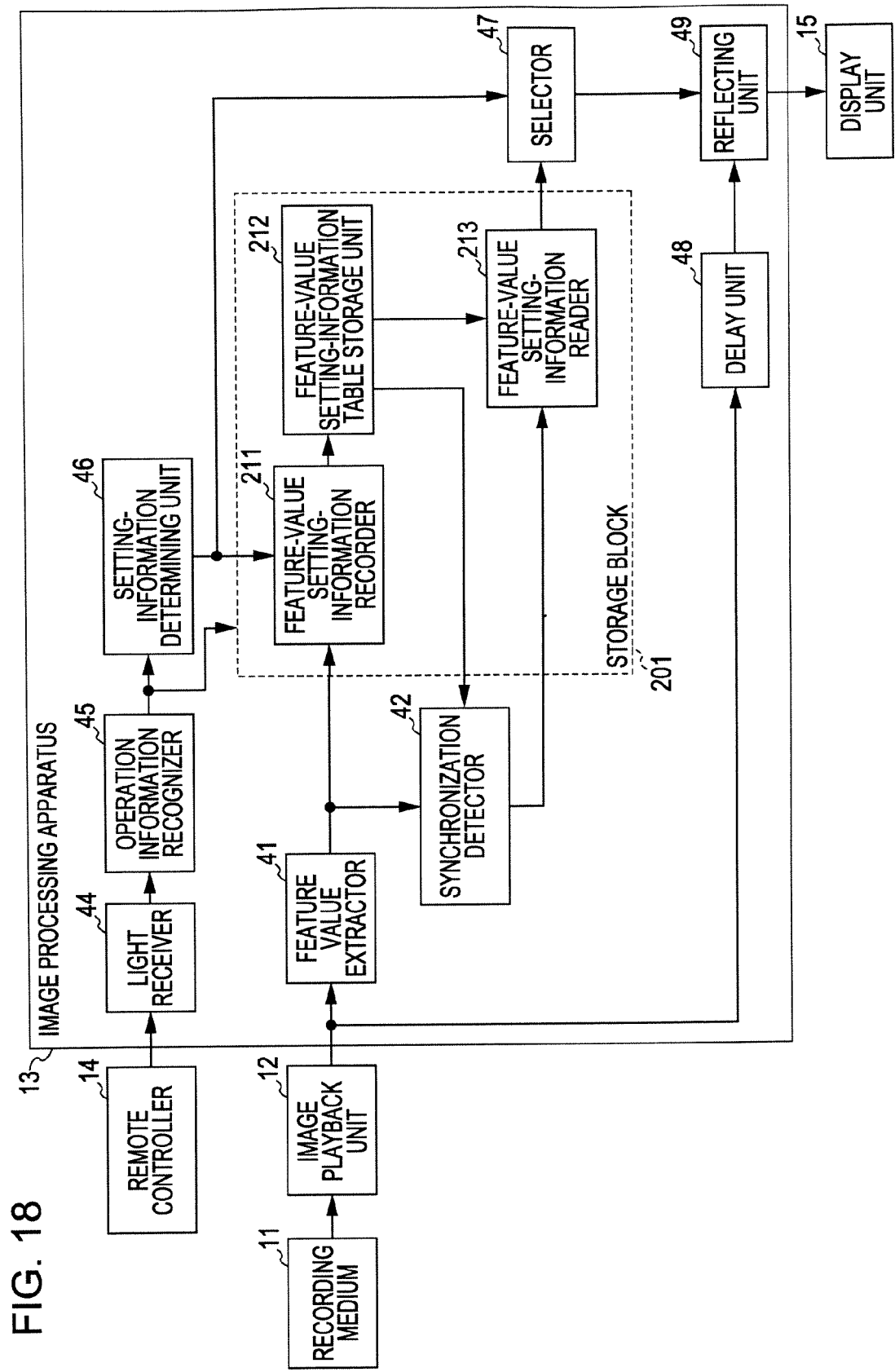
FIG. 18 is a block diagram of yet another exemplary structure of the image processing apparatus according to the embodiment of the present invention.

The recording means (e.g., a feature-value setting-information recorder 211 shown in FIG. 18) may record a table in which the feature value of the image is associated with the setting information in the data recording medium (e.g., a feature-value setting-information table storage unit 212 shown in FIG. 18).

Figure 7:
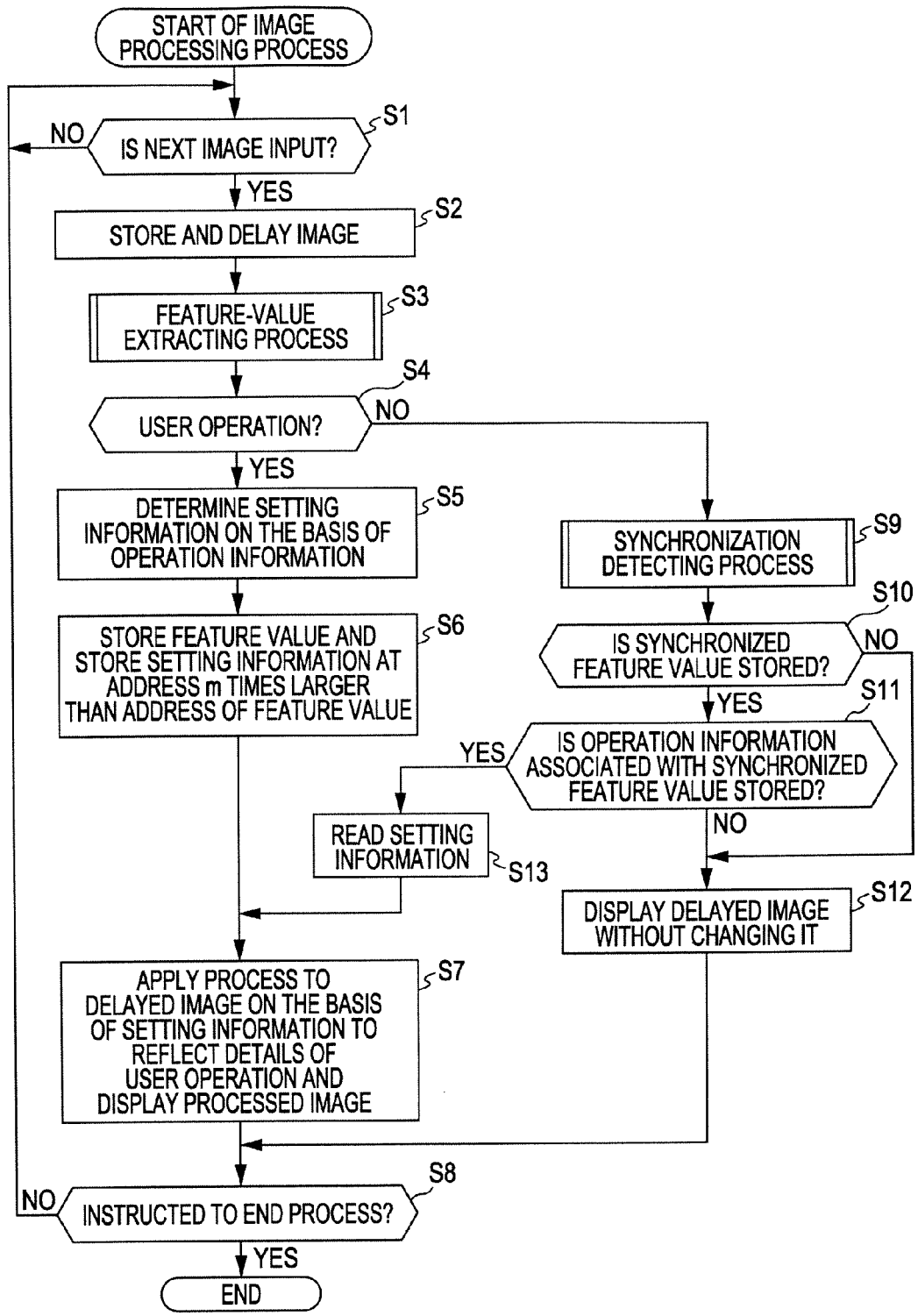
FIG. 7 is a flowchart of an image processing process performed by the image processing apparatus shown in FIG. 3.

A method and a program according to the first embodiment of the present invention include the steps of extracting a feature value from an image (e.g., step S3 of the flowchart shown in FIG. 7); setting setting information for applying a process to the image (e.g., step S5 of the flowchart shown in FIG. 7); and recording the setting information in association with the feature value of the image in a data recording medium (e.g., step S6 of the flowchart shown in FIG. 7).

A data recording medium (e.g., the feature-value setting-information storage unit 62 shown in FIG. 3) according to a second embodiment of the present invention includes a data structure in which setting information for applying a process to an image is recorded in association with a feature value of the image.

An image processing apparatus according to a third embodiment of the present invention includes playback-position feature-value extracting means (e.g., the feature value extractor 41 shown in FIG. 3) for extracting a feature value at a playback position as a playback-position feature value from an image at the playback position; synchronizing means (e.g., a synchronization detector 42 shown in FIG. 3) for synchronizing, with the playback-position feature value, a feature value in a data recording medium in which setting information for applying a process to the image is recorded in association with the feature value of the image; reading means (e.g., a feature-value setting-information reader 63 shown in FIG. 3) for reading, when the feature value in the data recording medium is synchronized with the playback-position feature value by the synchronizing means, setting information recorded in association with the synchronized playback-position feature value from the data recording medium; and reflecting means (e.g., a reflecting unit 49 shown in FIG. 3) for reflecting the process applied to the image at the playback position on the basis of the setting information read by the reading means.

The synchronizing means may include search-position feature-value extracting means (e.g., a search-position feature-value reader 104 shown in FIG. 6) for sequentially extracting, from the data recording medium in which the setting information for applying the process to the image is recorded in association with the feature value of the image, the feature value as a search-position feature value, and comparing means (e.g., a comparator 103 shown in FIG. 6) for sequentially comparing the playback-position feature value with the search-position feature value. When the comparison result shows that the playback-position feature value matches the search-position feature value, it may be regarded that the feature value in the data recording medium in which the setting information for applying the process to the image is recorded in association with the feature value of the image is synchronized with the playback-position feature value.

An image processing method and a program according to the third embodiment of the present invention include the steps of extracting a feature value at a playback position as a playback-position feature value from an image at the playback position (e.g., step S3 of the flowchart shown in FIG. 7); synchronizing, with the playback-position feature value, a feature value in a data recording medium in which setting information for applying a process to the image is recorded in association with the feature value of the image (e.g., step S9 of the flowchart shown in FIG. 7); reading, when the feature value in the data recording medium is synchronized with the playback-position feature value, setting information recorded in association with the synchronized playback-position feature value from the data recording medium (e.g., step S13 of the flowchart shown in FIG. 7); and reflecting the process applied to the image at the playback position on the basis of the read setting information (e.g., step S7 of the flowchart shown in FIG. 7).

Figure 1:
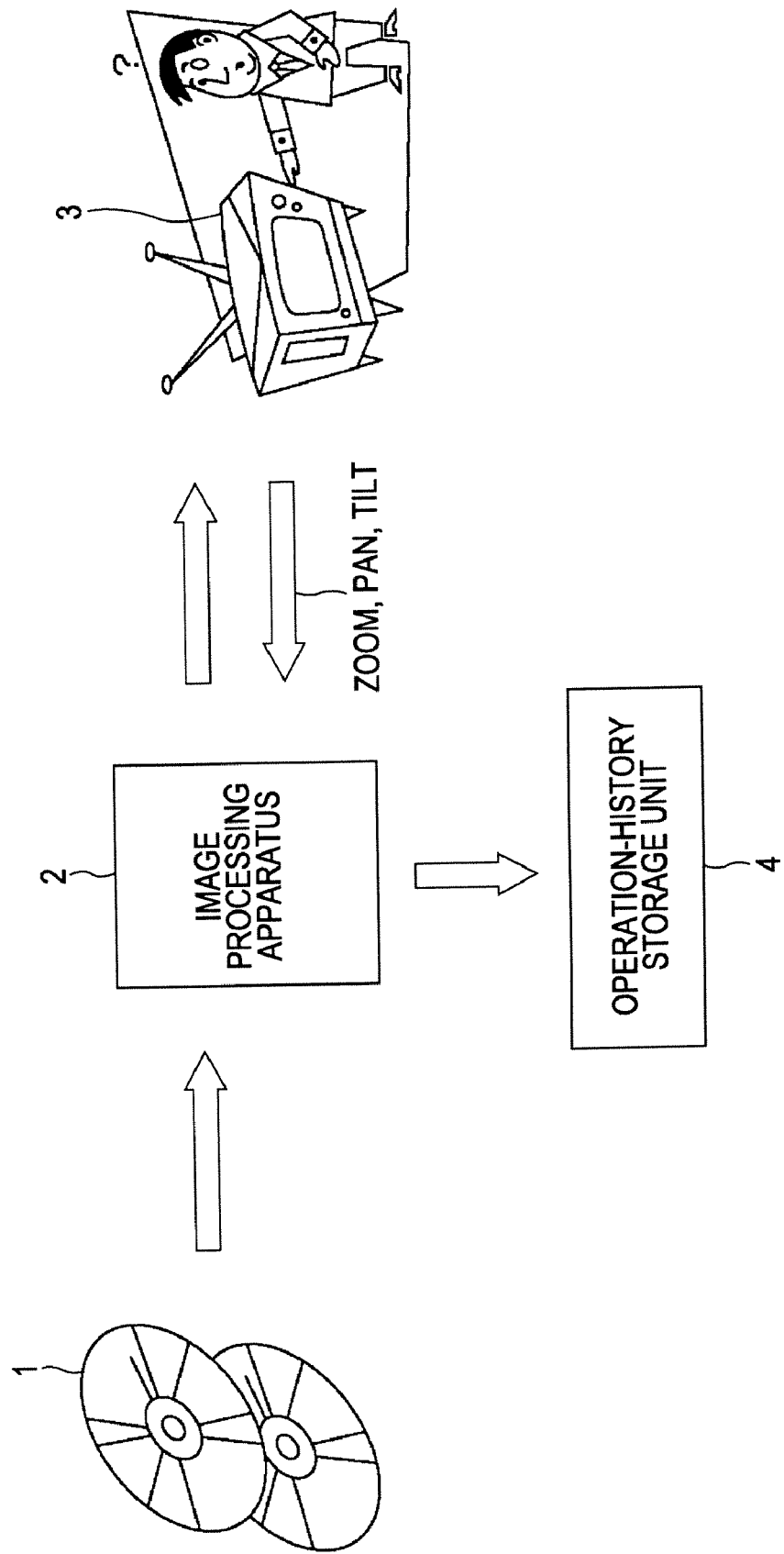
FIG. 1 illustrates the concept of an image processing apparatus according to an embodiment of the present invention.
Figure 2:
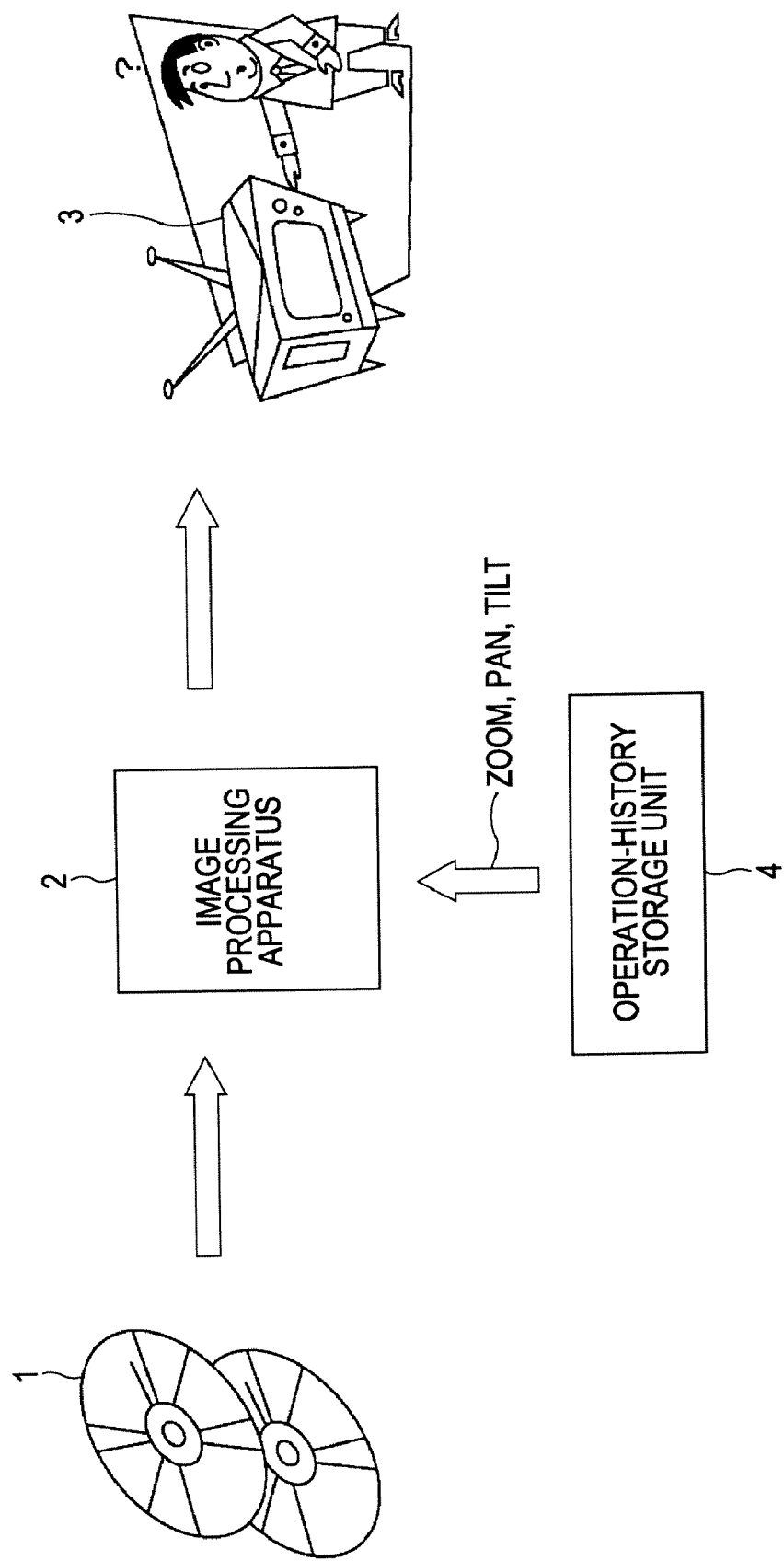
FIG. 2 illustrates the concept of the image processing apparatus according to the embodiment of the present invention.

Referring now to FIGS. 1 and 2, the concept of an image processing apparatus according to an embodiment of the present invention will be described. The image processing apparatus according to the embodiment of the present invention applies a process specified by a user to a pre-recorded image and displays the processed image. At the same time, the image processing apparatus extracts a feature value of the image and stores information about the details of the process in association with the feature value. Furthermore, when playing back the pre-recorded image, the image processing apparatus reads the stored information about the details of the process, applies the process to the image, and displays the processed image.

More specifically, the operation of an image processing apparatus 2 is divided into two modes: recording mode and playback mode.

In the recording mode, as shown in FIG. 1, the image processing apparatus 2 displays on a display unit 3 an image played back by a digital versatile disc (DVD) player or the like from a recording medium 1, such as a DVD, in which content including a moving image is recorded in advance. In this state, when a user operates a remote controller or the like to specify a process (e.g., zoom, pan, or tilt) to be applied to a desired image, the image processing apparatus 2 generates setting information associated with the details of the user operation, applies the process associated with the setting information to the image, and displays the processed image on the display unit 3. Furthermore, the image processing apparatus 2 extracts a feature value from the image and stores the setting information in association with the extracted feature value in an operation-history storage unit 4.

Next, in the playback mode, as shown in FIG. 2, the image processing apparatus 2 reads an image played back by the DVD player or the like from the recording medium 1 in which content including a moving image is recorded in advance and extracts a feature value. At the same time, in synchronization with the feature value of the image read from the recording medium 1, the image processing apparatus 2 reads the setting information recorded in association with the feature value in the operation-history storage unit 4, applies the process to the image on the basis of the read setting information, and displays the processed image on the display unit 3.

With the above-described operation, the image processing apparatus 2 stores only the details of the process applied to the pre-recorded image, and does not record the result of the process or the processed image. In this way, the image processing apparatus 2 can repeatedly play back the result of the process or the processed image. As a result, the image processing apparatus 2 can repeatedly apply various image processes to a pre-recorded "copy-once" image whose number of reproductions is limited.

The image processing apparatus 2, which has been described with reference to FIGS. 1 and 2, will be described in detail below.

FIG. 3 is a diagram of the structure of an image processing apparatus 13 according to an embodiment of the present invention, which corresponds to the image processing apparatus 2 shown in FIGS. 1 and 2.

An image playback unit 12 decodes an image that has been preliminarily encoded in a predetermined format and recorded in a recording medium 11, which corresponds to the recording medium 1 shown in FIGS. 1 and 2, and sequentially supplies decoded images to a feature value extractor 41 and a delay unit 48.

The feature value extractor 41 extracts a feature value of one of the images sequentially supplied from the image playback unit 12 and supplies the feature value to a synchronization detector 42 and a feature-value setting-information recorder 61 in a storage block 43. The structure of the feature value extractor 41 will be described later in detail with reference to FIG. 4.

A remote controller 14 includes keys and buttons. As shown in FIGS. 1 and 2, the remote controller 14 is operated by the user when the user wants to specify the details of a process to be applied to a desired image. In accordance with the user operation, the remote controller 14 generates an operation signal and a light emitting pattern such as an infrared light emitting pattern in accordance with the generated operation signal and emits light to a light receiver 44 of the image processing apparatus 13.

The light receiver 44 converts the light emitting pattern of the remote controller 14 into the operation signal of the remote controller 14 and supplies the operation signal to an operation information recognizer 45. On the basis of the operation signal supplied from the light receiver 44, the operation information recognizer 45 recognizes operation information associated with the user-desired process to be applied to the image and supplies the recognition result or the operation signal to the setting-information determining unit 46. The storage block 43 may be turned on or off on the basis of the operation information from the remote controller 14. When the operation information recognizer 45 recognizes the operation information that turns on or off the storage block 43, the operation information recognizer 45 turns on or off the operation of the storage block 43.

On the basis of the operation information supplied from the operation information recognizer 45, the setting-information determining unit 46 determines, for a reflecting unit 49 described later, setting information for specifying the details of the process to be applied to the image and supplies the setting information to the feature-value setting-information recorder 61 and a selector 47.

The feature-value setting-information recorder 61 in the storage block 43 stores the feature value supplied from the feature value extractor 41 and the setting information supplied from the setting-information determining unit 46 in association with each other in a feature-value setting-information storage unit 62 (corresponding to the operation-history storage unit 4 shown in FIGS. 1 and 2).

The synchronization detector 42 searches for, among feature values (search-position feature values described later) stored in the feature-value setting-information storage unit 62, a feature value (playback-position feature value described later) of an image being played back by the image playback unit 12, which has been supplied from the feature value extractor 41, and, when the same feature value is detected, the synchronization detector 42 supplies the detection result as the image's synchronization position to a feature-value setting-information reader 63. The structure of the synchronization detector 42 will be described later in detail with reference to FIG. 6.

When the feature-value setting-information reader 63 obtains the feature value (search-position feature value) detected as the synchronization position by the synchronization detector 42, the feature-value setting-information reader 63 reads the setting information stored in association with the feature value in the feature-value setting-information storage unit 62 and supplies the setting information to the selector 47. When the setting information is supplied from the setting-information determining unit 46, even if the setting information is supplied at the same time from the feature-value setting-information reader 63, the selector 47 supplies the setting information from the setting-information determining unit 46 to the reflecting unit 49. When no setting information is supplied from the setting-information determining unit 46 and when the setting information is supplied from the feature-value setting-information reader 63, the selector 47 supplies the setting information supplied from the feature-value setting-information reader 63 to the reflecting unit 49. When no setting information is supplied from the setting-information determining unit 46 or the feature-value setting-information reader 63, the selector 47 supplies no setting information to the reflecting unit 49.

The delay unit 48 temporarily stores an image supplied from the image playback unit 12 for a processing delay time of the feature value extractor 41, the synchronization detector 42, the storage block 43, and the selector 47 and outputs the image to the reflecting unit 49. When the setting information is supplied from the selector 47, the reflecting unit 49 reflects the process to be applied to the image supplied from the delay unit 48 in the image and displays the processed image on a display unit 15. When no setting information is supplied from the selector 47, the reflecting unit 49 displays the image supplied from the delay unit 48 on the display unit 15 without changing the image.

Figure 4:
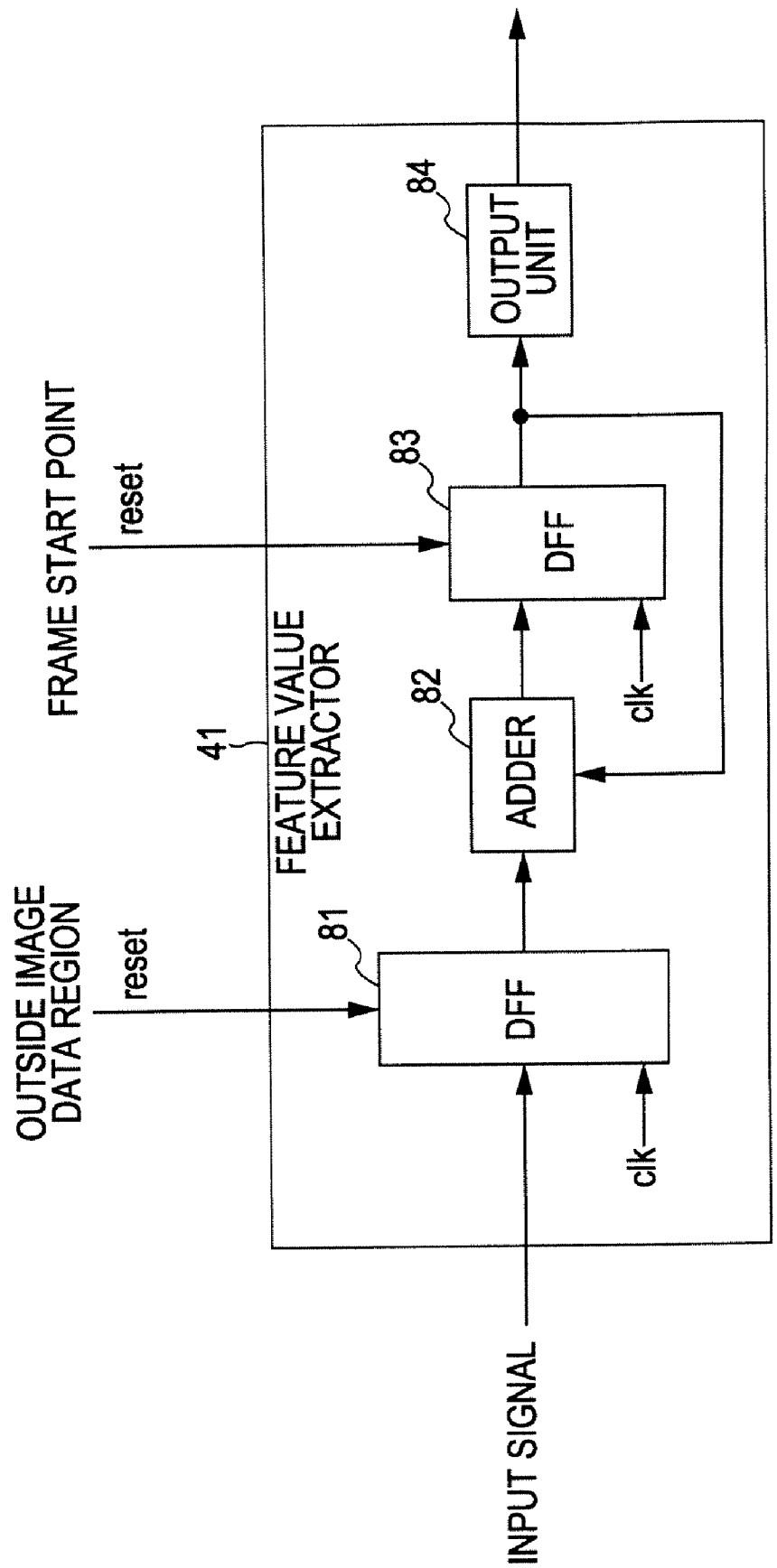
FIG. 4 is a block diagram of an exemplary structure of a feature value extractor shown in FIG. 3.

Referring now to FIG. 4, the detailed structure of the feature value extractor 41 will be described.

Figure 5:
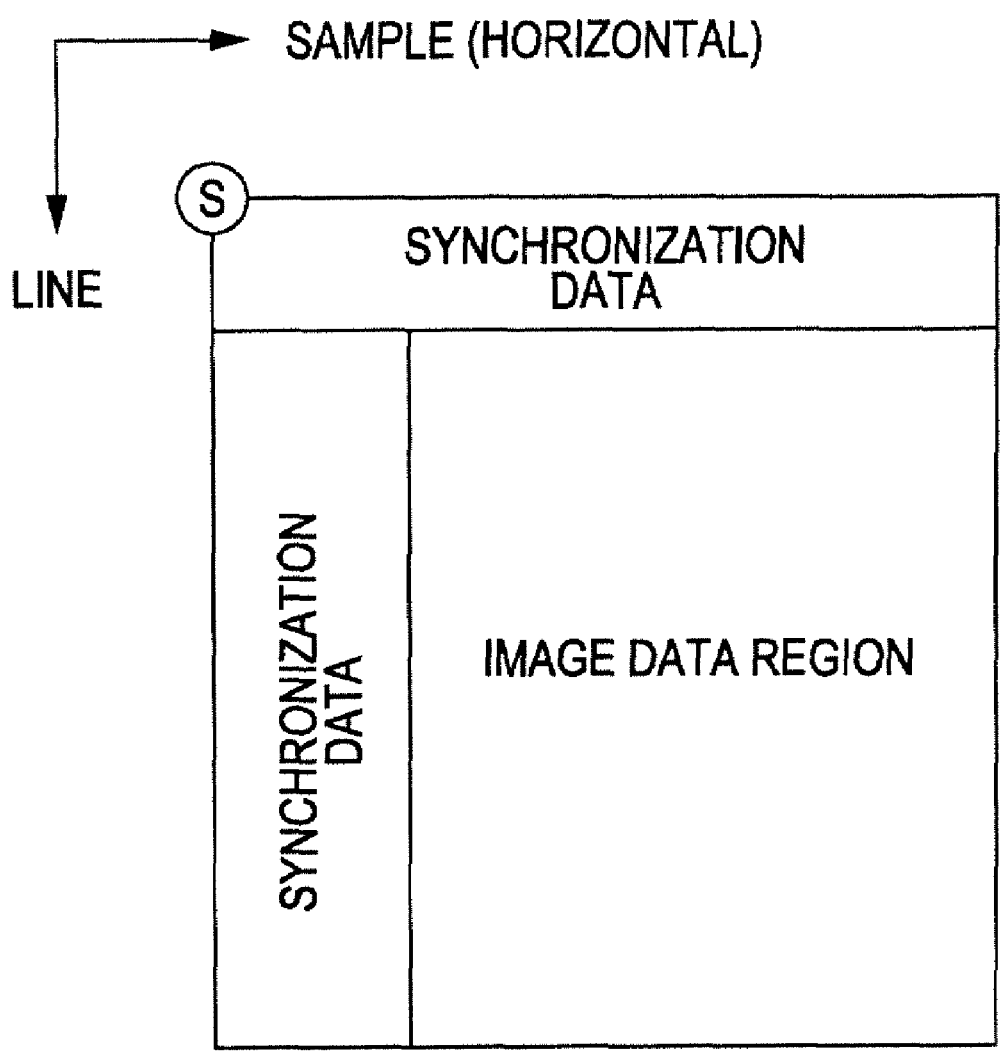
FIG. 5 is a diagram of an exemplary structure of an image signal.

A D flip flop (DFF) 81 stores an immediately preceding input signal and outputs the input signal to an adder 82 at a time at which a clock signal (clk) is input from a clock signal generator (not shown). When the input signal is outside an image data region of the image signal, a reset signal is input to the DFF 81 to delete the input signal, and no input signal is output. That is, as shown in FIG. 5, the image signal includes a synchronization data region and an image data region. When the input signal is synchronization data outside the image data region in accordance with positional information sequentially input starting from a frame start point S, which is the circled origin of horizontal samples and vertical lines shown in FIG. 5, a reset signal is input to the DFF 81, and the signal constituting the synchronization data is not output to the adder 82. In other words, of input signals constituting the image, the DFF 81 only supplies data in the image data region in synchronization with the clock signal to the adder 82.

The adder 82 adds the signal supplied from the DFF 81 and a signal supplied from a DFF 83 and outputs the sum to the DFF 83. More specifically, the adder 82 extracts the eight least significant bits of the sum of the signal supplied from the DFF 81 and the signal supplied from the DFF 83 and outputs the extracted eight bits to the DFF 83.

The DFF 83 supplies the signal supplied from the adder 82 to the adder 82 and an output unit 84 at a time at which a clock signal (clk) generated by a clock generator (not shown) is input thereto. When a signal at the frame start point S (the circled origin of horizontal samples and vertical lines shown in FIG. 5) is input to the DFF 83, a reset signal is input to the DFF 83 to delete the input signal, and no input signal is output. That is, of input signals constituting the image, the DFF 83 only supplies a value generated by accumulatively adding data in the image data region by the adder 82 to the output unit 84.

When a value in one frame (or one field) is supplied from the DFF 83 to the output unit 84, the output unit 84 outputs the value as a feature value of an image within that frame (or field). That is, the output unit 84 outputs the eight least significant bits of the value generated by accumulatively adding data in the image data region by the adder 82 as the feature value of that frame (or field). Since a feature value may be any information that can be used to recognize an image in units of frames, the feature value is not limited to the eight least significant bits of the value generated by accumulatively adding only data in the image data region (only pixel values). Alternatively, for example, the sum of pixel values within a predetermined region near the center of the image data region may be used as a feature value.

Figure 6:
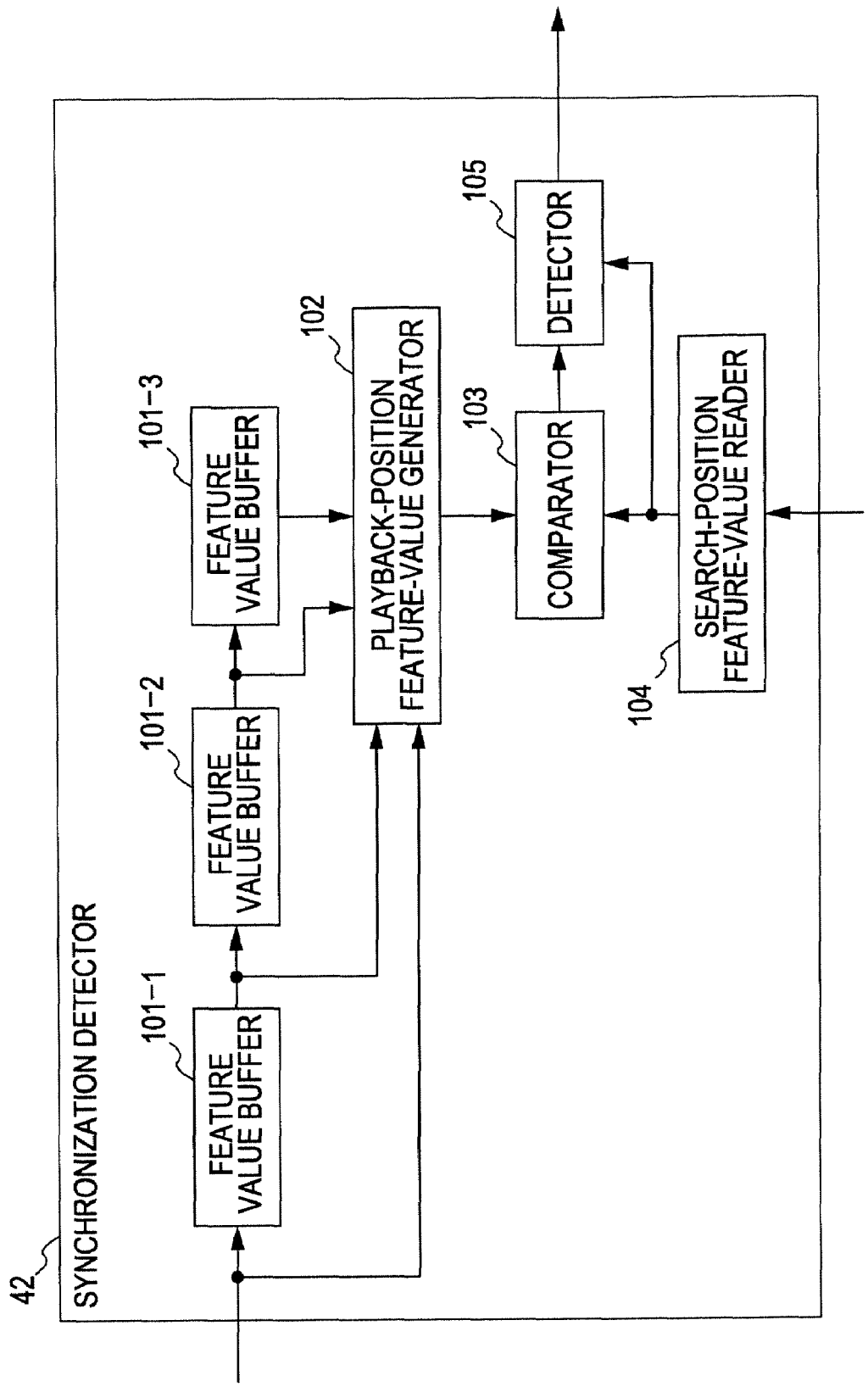
FIG. 6 is a block diagram of an exemplary structure of a synchronization detector shown in FIG. 3.

Referring now to FIG. 6, the detailed structure of the synchronization detector 42 will be described.

Feature value buffers 101-1 to 101-3 temporarily store the supplied feature value and sequentially output the stored feature value to a playback-position feature-value generator 102 and the feature value buffers 101-2 and 101-3 at a subsequent stage. Since there is no feature value buffer 101 subsequent to the feature value buffer 101-3, the feature value buffer 101-3 supplies the feature value only to the playback-position feature-value generator 102. The playback-position feature-value generator 102 sequentially obtains the feature values of the last three frames, including the most recent feature value, supplied from the feature value buffers 101-1 to 101-3, combines these feature values as playback position information (playback-position feature values) and outputs the playback position information to a comparator 103. That is, the playback-position feature-value generator 102 uses a total of four feature values of the most recent frame and the three previous frames as feature values for specifying the playback position and generates playback-position feature values.

A search-position feature-value reader 104 sequentially reads a set of four consecutive feature values stored in the feature-value setting-information storage unit 62 and supplies the four consecutive feature values as search-position feature values to the comparator 103 and a detector 105. The comparator 103 compares the playback-position feature values supplied from the playback-position feature-value generator 102 with the search-position feature values sequentially supplied from the search-position feature-value reader 104. When the comparator 103 finds the search-position feature values that match the playback-position feature values, the comparator 103 regards this as demonstrating that synchronization is detected and informs the detector 105 of the detection result demonstrating that synchronization is detected. The detector 105 outputs the search-position feature values supplied from the search-position feature-value reader 104 as the synchronization detection result at a time at which it is regarded by the comparator 103 that synchronization is detected.

Referring now to the flowchart shown in FIG. 7, an image processing process performed by the image processing apparatus 13 shown in FIG. 3 will be described. In the following description, it is assumed that the storage block 43 is turned on.

In step S1, the delay unit 48 determines whether a new image is supplied from the image playback unit 12. This determination is repeated until a new image is supplied.

For example, when the image playback unit 12 reads an image recorded in the recording medium 11 and when the delay unit 48 determines that a new image is supplied from the image playback unit 12, in step S2, the delay unit 48 stores the supplied image to temporarily delay the image by one frame. In the following description, it is assumed that the image is processed in units of frames. Needless to say, however, the image is not limited to being processed in units of frames. Alternatively, for example, the image may be processed in units of fields.

In step S3, the feature value extractor 41 executes a feature-value extracting process and extracts a feature value of the image within one frame supplied from the image playback unit 12. That is, when the delay unit 48 temporarily stores the new image to delay the new image by one frame, the same image within that frame is also supplied to the feature value extractor 41. Therefore, the same image is temporarily stored to be delayed, and, at the same time, the feature value of the same image is extracted.

Figure 8:
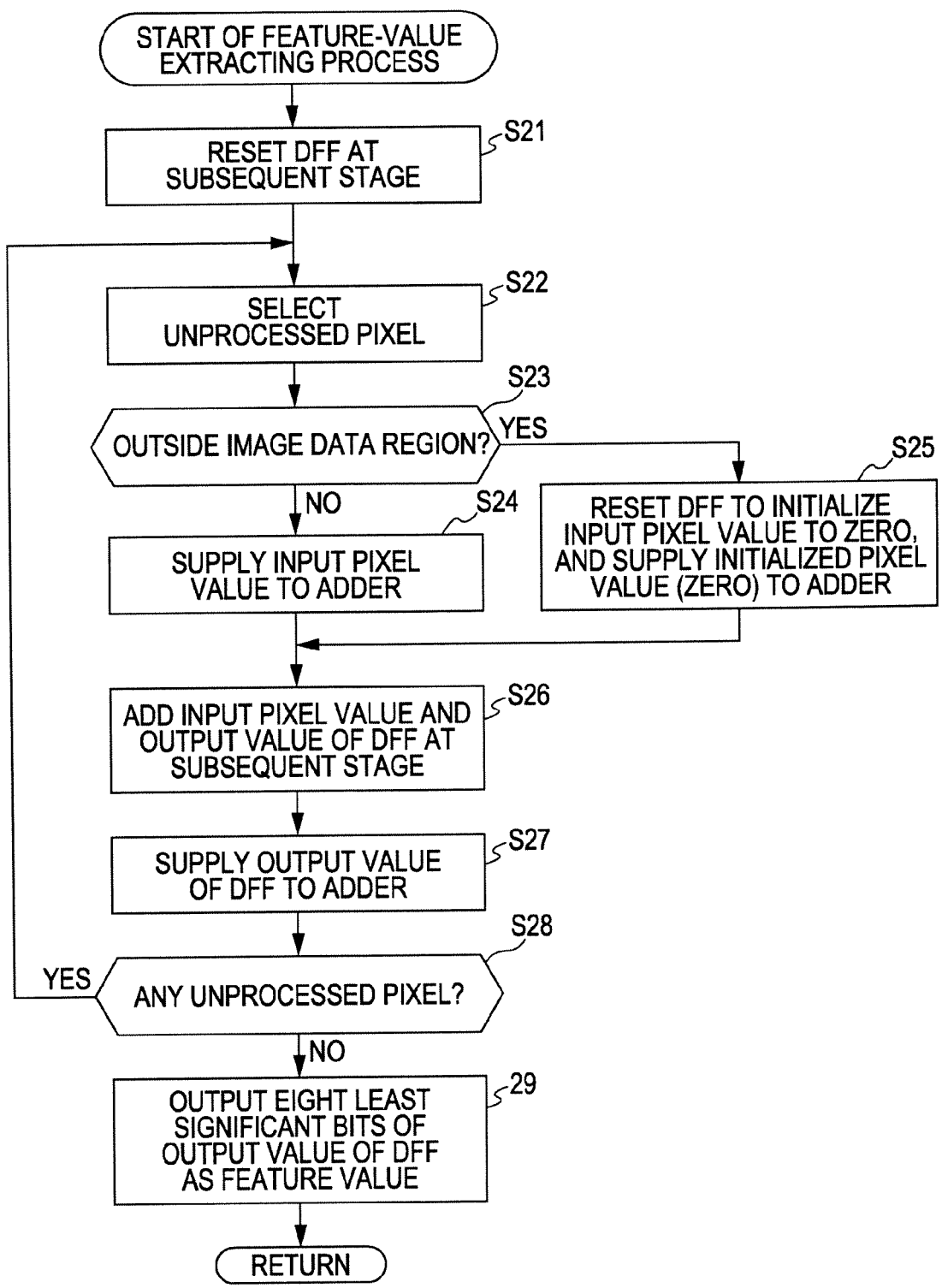
FIG. 8 is a flowchart of a feature-value extracting process shown in FIG. 7.

With reference to the flowchart shown in FIG. 8, the feature-value extracting process will be described.

In step S21, the DFF 83 is reset due to the frame start point S (FIG. 5).

In step S22, an unprocessed pixel is selected. In step S23, it is determined whether the pixel is outside the image data region. More specifically, for example, unprocessed pixels of the image within one frame are sequentially read in, for example, a raster scanning order, and it is determined whether each of the unprocessed pixels is outside the image data region.

As shown in FIG. 5, since the first pixel (pixel at the frame start point S) is included in synchronization data, the first pixel is outside the image data region. In step S25, the DFF 81 is reset, and the DFF 81 outputs zero as a pixel value. In contrast, when a pixel to be processed is selected in the raster scanning order and is within the image data region, in step S24, the DFF 81 supplies the pixel value of that pixel to the adder 82 in accordance with a generation timing of a clock signal.

In step S26, the adder 82 adds the input pixel value and a signal supplied from the DFF 83 and supplies the sum to the DFF 83.

In step S27, the DFF 83 returns the eight least significant bits of the sum supplied from the adder 82 in accordance with a generation timing of a clock signal. Here, although the DFF 83 outputs the sum to the output unit 84, the output unit 84 does not output the sum.

In step S28, it is determined whether there is another unprocessed pixel. If there is another unprocessed pixel, the flow returns to step S22. That is, the process in steps S22 to S28 is repeated until all the pixels in one frame are processed. When it is determined that all the pixels in one frame are processed, in step S29, the output unit 84 outputs the sum supplied from the DFF 83, namely, the eight least significant bits of the accumulative sum of pixel values contained in the image data region, as a feature value of the image of the frame.

With the above-described operation, the eight least significant bits of the accumulative sum of all the pixel values in the image data region are extracted from the image signal of one frame as the feature value of that frame.

The description returns to the flowchart shown in FIG. 7.

In step S4, the operation information recognizer 45 determines whether the remote controller 14 is operated by the user to specify a process to be applied to the image. For example, when the user specifies double zooming (2× zoom) looking at the image displayed on the display unit 15, the light receiver 44 receives a light emitting pattern of the remote controller 14. When a signal based on the light emitting pattern received by the light receiver 44 is supplied to the operation information recognizer 45, the operation information recognizer 45 determines that a user operation has been performed, and the flow proceeds to step S5.

In step S5, the operation information recognizer 45 recognizes operation information on the basis of the signal supplied from the light receiver 44 and supplies the operation information as the recognition result to the setting-information determining unit 46. On the basis of the operation information, the setting-information determining unit 46 determines, for the reflecting unit 49, setting information for applying a process to the image and supplies the setting information to the feature-value setting-information recorder 61 and the selector 47. That is, in this case, since it has been instructed to apply double zooming (2× zoom) to the image, setting information for specifying double zooming (2× zoom) is determined for the reflecting unit 49, and the setting information is supplied to the feature-value setting-information recorder 61 and the selector 47.

Figure 9:
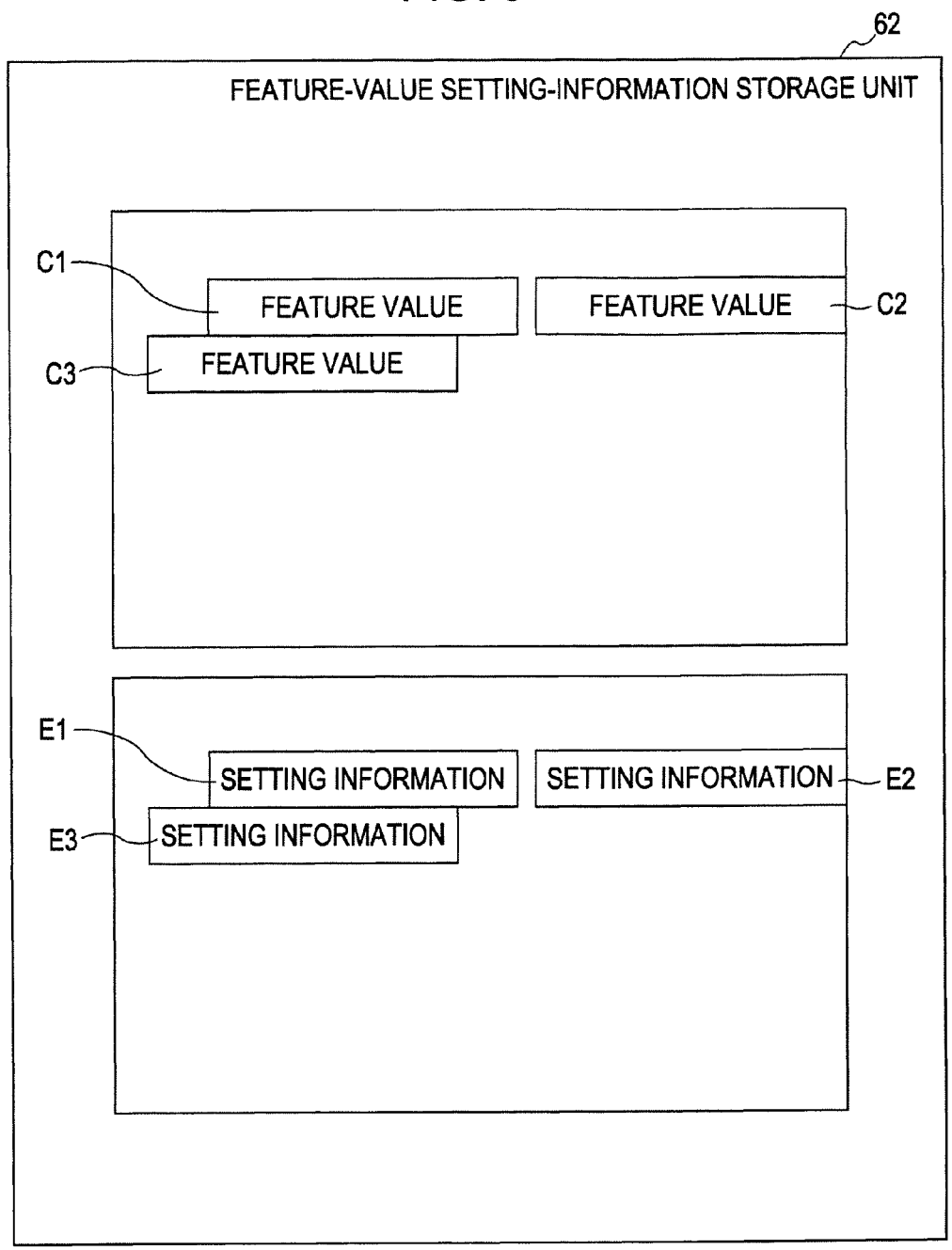
FIG. 9 is a diagram of the feature-value extracting process shown in FIG. 7.

In step S6, the feature-value setting-information recorder 61 records the feature value supplied from the feature value extractor 41 in the feature-value setting-information storage unit 62, and, at the same time, records the setting information supplied from the setting-information determining unit 46 in association with the feature value in the feature-value setting-information storage unit 62. In this manner, the feature value and the setting information are stored. More specifically, as shown in FIG. 9, when a feature value C1 is recorded at a predetermined address A, setting information E1 associated with the feature value C1 is recorded at an address m times larger than the address A, i.e., an address m×A. FIG. 9 shows the allocation of addresses at which feature values and setting information are stored in the feature-value setting-information storage unit 62.

Thereafter, the feature-value setting-information recorder 61 similarly records a feature value C2 at an address B and setting information E2 associated with the feature value C2 at an address m×B, and records a feature value C3 at an address C and setting information E3 associated with the feature value C3 at an address m×C. In this manner, the setting information is stored in association with the feature value. Once the feature value is determined, the address of the setting information can be specified from the address of the feature value. Therefore, a setting information search can be smoothly conducted for each feature value in the feature-value setting-information storage unit 62. The feature values and setting information are continuously recorded for a period during which the same process is continuously specified. That is, the feature values C1 to C3 shown in FIG. 9 are not limited to those within one frame. Feature values within frames during which the same process is continuously specified are continuously recorded. The same applies to the setting information. For example, the setting information E1 to E3 shown in FIG. 9 is not limited to that within one frame on the basis of the addresses associated with the feature values C1 to C3. Pieces of setting information within frames during which the same process is continuously specified are continuously recorded.

Since the setting information is supplied from the setting-information determining unit 46 to the selector 47, the selector 47 supplies in step S7 the setting information supplied from the setting-information determining unit 46 to the reflecting unit 49. On the basis of the setting information supplied from the selector 47, the reflecting unit 49 applies the process to the image stored in the delay unit 48 so that the process in accordance with the details of the instruction given by the user is reflected in the image and displays the processed image on the display unit 15.

In step S8, the operation information recognizer 45 determines whether it is instructed to end the operation. If the determination shows that it is instructed to end the operation, the process is ended. In contrast, if the determination does not show that it is instructed to end the operation, the flow returns to step S1.

That is, as long as the user operates the remote controller 14 to give an instruction to apply a process to an image, the process in steps S1 to S8 is repeated, and feature values and setting information associated therewith based on the details of the process are stored in the feature-value setting-information storage unit 62. The operational state in which steps S1 to S8 are repeated corresponds to the operation in the recording mode described with reference to FIG. 1.

In contrast, when it is determined in step S4 that no user operation is performed, the flow proceeds to step S9, and the synchronization detector 42 executes a synchronization detecting process and detects synchronization of a feature value of the image being played back with a feature value to which setting information for applying a process to the image is associated.

Figure 10:
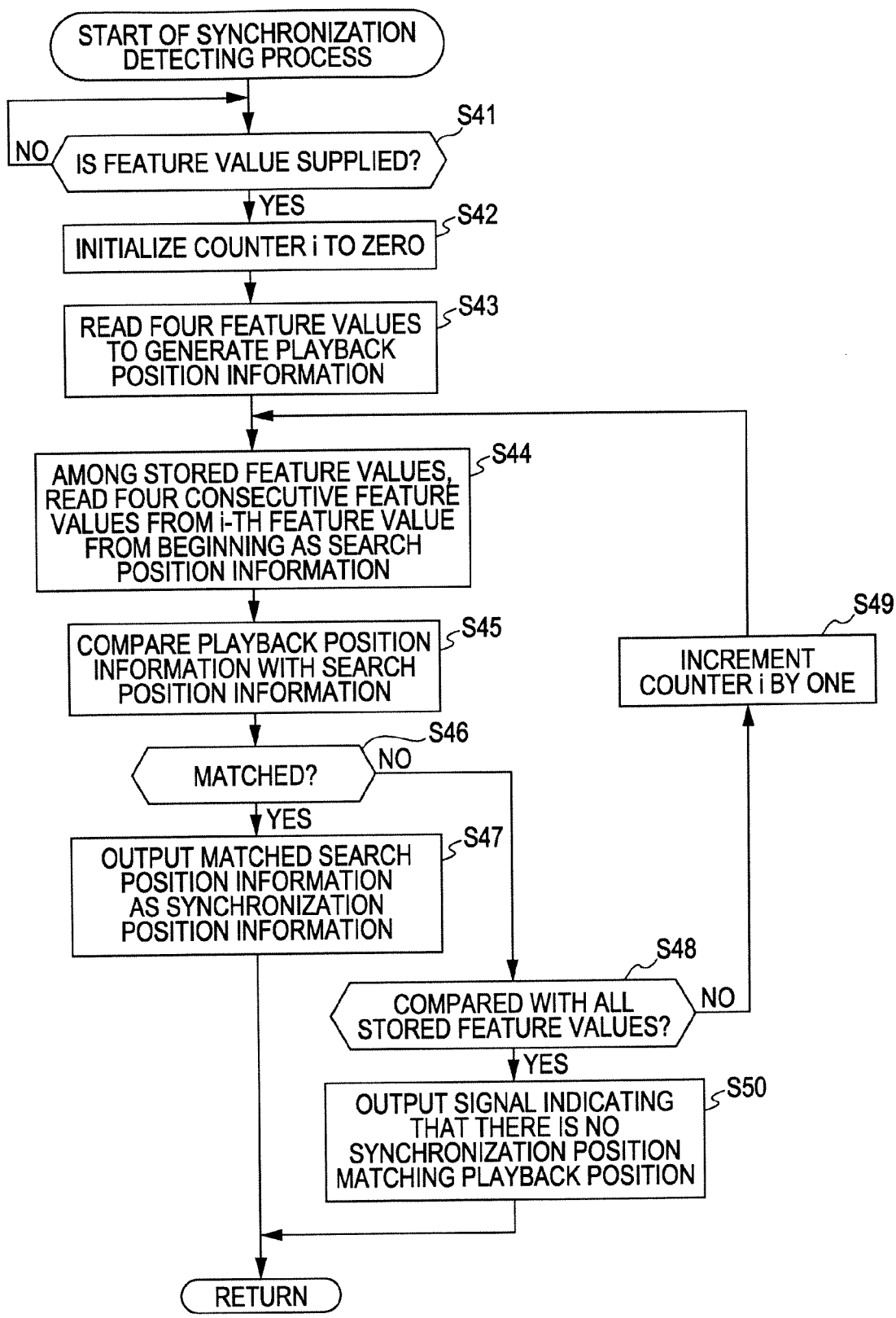
FIG. 10 is a flowchart of a synchronization detecting process shown in FIG. 7.

With reference to the flowchart shown in FIG. 10, the synchronization detecting process will be described.

In step S41, the playback-position feature-value generator 102 in the synchronization detector 42 determines whether a feature value is supplied from the feature value extractor 41. The determination is repeated until a feature value is supplied. For example, when a feature value is extracted by the feature-value extracting process performed in step S3 and the feature value of the image being played back is supplied from the feature value extractor 41, the flow proceeds to step S42.

In step S42, the search-position feature-value reader 104 initializes a counter i for counting search-position feature values.

In step S43, the playback-position feature-value generator 102 obtains the supplied feature value and the feature values stored in the feature value buffers 101-1 to 101-3. That is, when a new feature value is supplied to the feature value buffer 101-1, the feature value buffer 101-1 supplies the stored feature value to the playback-position feature-value generator 102 and the feature value buffer 101-2. Similarly, the feature value buffer 101-2 stores the supplied feature value and supplies the previously-stored feature value to the playback-position feature-value generator 102 and the feature value buffer 101-3. Furthermore, the feature value buffer 101-3 stores the feature value supplied from the feature value buffer 101-2 and supplies the previously-stored feature value to the playback-position feature-value generator 102. As a result, the feature value of the most recent frame and the feature values of the last three frames stored in the feature value buffers 101-1 to 101-3 are supplied to the playback-position feature-value generator 102. The playback-position feature-value generator 102 supplies the feature values of the four frames including the frame being played back as playback-position feature values to the comparator 103.

In step S44, the search-position feature-value reader 104 reads feature values of four consecutive frames starting from the i-th frame from the beginning of the feature values stored in the feature-value setting-information storage unit 62 as search-position feature values and supplies the search-position feature values to the comparator 103 and the detector 105.

In step S45, the comparator 103 compares the playback-position feature values, which are supplied from the playback-position feature-value generator 102 and which include a total of four feature values of the frame being played back and the last three frames, with the search-position feature values, which are supplied from the search-position feature-value reader 104 and which include the feature values of the four consecutive frames starting from the i-th frame from the beginning of the feature values stored in the feature-value setting-information storage unit 62.

In step S46, the comparator 103 determines on the basis of the comparison result whether the playback-position feature values match the search-position feature values. For example, when it is determined in step S46 that no matching is detected, in step S48, the search-position feature-value reader 104 determines whether the playback-position feature values have been compared with all the feature values stored in the feature-value setting-information storage unit 62. For example, when it is determined in step S48 that the playback-position feature values have not been compared with all the feature values in the feature-value setting-information storage unit 62, in step S49, the search-position feature-value reader 104 increments the counter i by one, and the flow returns to step S44. That is, with this operation, the process in steps S44 to S46, S48, and S49 is repeated when the playback-position feature values do not match the search-position feature values and until the playback-position feature values are compared with all the stored feature values. With shifts of one frame, the search-position feature values, which are the feature values of four consecutive frames, are compared with the playback-position feature values.

Figure 11:
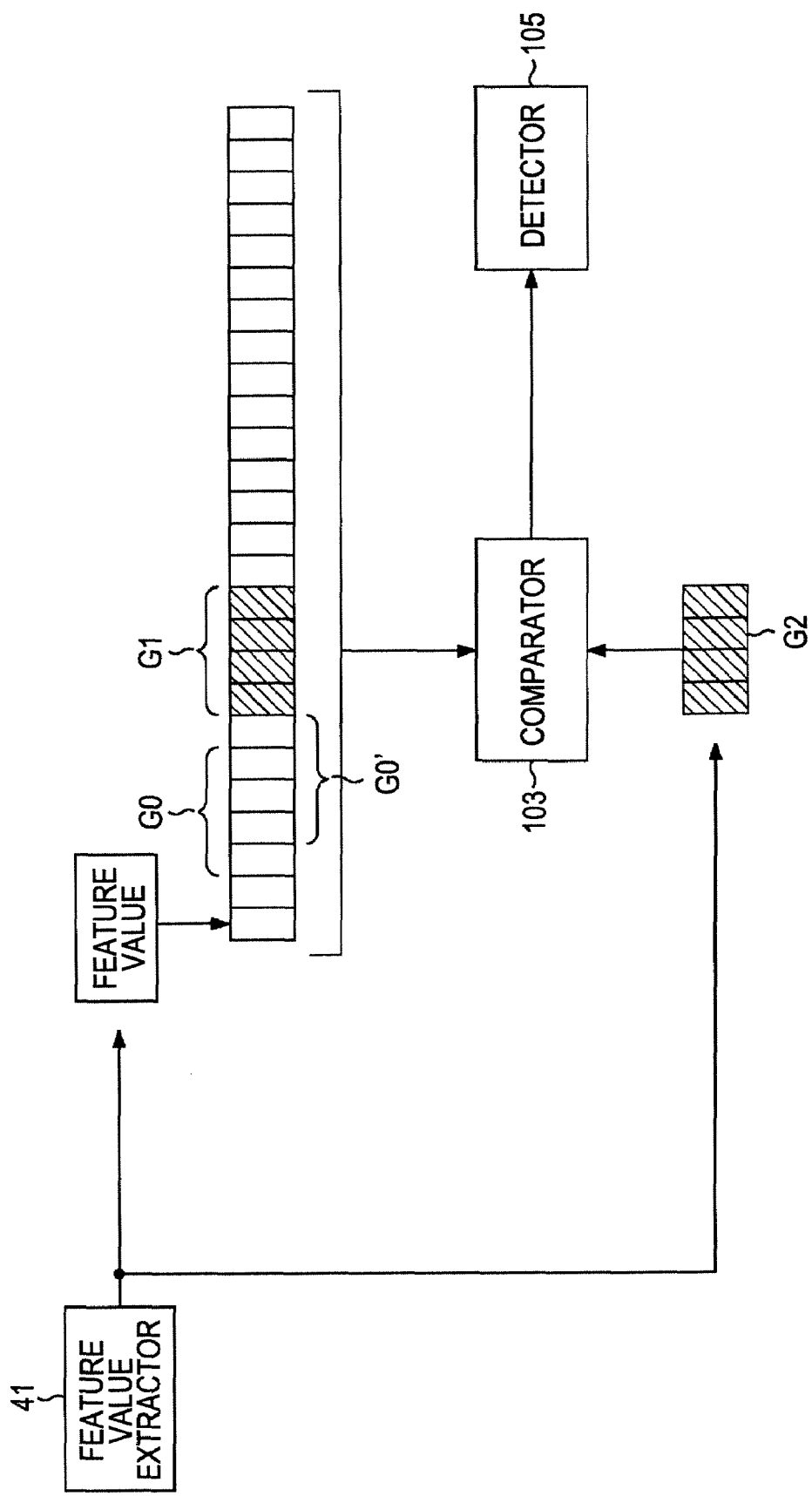
FIG. 11 is a diagram of the synchronization detecting process shown in FIG. 7.

That is, as shown in the upper right portion of FIG. 11, the search-position feature values are, in this state, a bulk of four consecutive feature values from among the feature values sequentially stored by the feature value extractor 41. In FIG. 11, the vertically long rectangle shape represents a feature value of one frame. Shaded portions G1 and G2 indicate that the same consecutive feature values are allocated. As shown in the lower right portion of FIG. 11, the playback-position feature values are a bulk of feature values of four consecutive frames including a feature value of a frame being played back, which are supplied from the feature value extractor 41.

For example, as shown in FIG. 11, when the playback-position feature values G2 are compared with search-position feature values G0, the playback-position feature values G2 do not match the search-position feature values G0, and hence no synchronization position is detected. Since not all the stored feature values are compared with the playback-position feature values G2, the counter i is incremented by one, and the playback-position feature values G2 are compared with search-position feature values G0'. In this manner, the search-position feature values are repeatedly compared with the playback-position feature values G2 with shifts of one frame to the right.

In step S46, for example, when the playback-position feature values G2 are compared with the search-position feature values G1, the search-position feature values G1 and the playback-position feature values G2 are the same in structure, and it is thus regarded that the search-position feature values G1 match the playback-position feature values G2. In step S47, the comparator 103 informs the detector 105 that the search-position feature values G1 match the playback-position feature values G2. On the basis of this information, the detector 105 supplies the beginning of the search-position feature values currently supplied from the search-position feature-value reader 104, that is, the i-th feature value from the beginning, as synchronization position information to the feature-value setting-information reader 63.

In contrast, when it is determined in step S48 that comparisons have been conducted with all the stored search-position feature values, in step S50, the detector 105 outputs information indicating that there is no search-position feature values matching the playback-position feature values and hence there is no synchronization.

With the above-described operation, the feature value of the image being played back can be synchronized with the feature value stored in the feature-value setting-information storage unit 62. In other words, to reduce the possibility of detecting synchronization at a wrong place due to accidental matching of only the feature value of the frame being played back with one of the feature values stored in the feature-value setting-information storage unit 62, not only the feature value of the frame being played back, but also the feature values of four frames including the frame being played back and the last three frames are compared with the feature values stored in the feature-value setting-information storage unit 62. Accordingly, synchronization detection can be performed more accurately. Since the feature values are used in this manner, the feature values can be set instead of time codes in units of frames. Without using time codes, synchronization can be detected in units of frames.

The description returns to the flowchart shown in FIG. 7.

In step S10, the feature-value setting-information reader 63 determines whether the feature value that matches the playback-position feature value of the frame being played back is stored in the feature-value setting-information storage unit 62. For example, when the synchronization position information is supplied in step S47 of the flowchart shown in FIG. 10, the feature value that matches the playback-position feature value of the frame being played back is stored in the feature-value setting-information storage unit 62. Thus, the flow proceeds to step S11.

In step S11, the feature-value setting-information reader 63 determines whether the setting information associated with the synchronized feature value is stored in the feature-value setting-information storage unit 62. That is, a feature value may be stored in the feature-value setting-information storage unit 62 without being associated with setting information. Therefore, the presence of the setting information associated with the feature value is determined in step S11.

When it is determined in step S11 that, for example, no setting information associated with the feature value is stored, in step S12, the feature-value setting-information reader 63 supplies no setting information to the selector 47. With this operation, no setting information is supplied from the setting-information determining unit 46 or the feature-value setting-information reader 63 to the selector 47, and hence no setting information specifying a process is supplied to the reflecting unit 49. As a result, the reflecting unit 49 displays the image of the frame, which is temporarily stored in the delay unit 48, on the display unit 15 without changing the image.

In contrast, when it is determined in step S11 that, for example, the setting information associated with the feature value is stored, in step S13, the feature-value setting-information reader 63 reads the setting information stored in association with the feature value of the synchronization position information and supplies the setting information to the selector 47. The flow proceeds to step S7. That is, in this case, no setting information is supplied from the setting-information determining unit 46 to the selector 47, and the setting information is supplied from the feature-value setting-information reader 63 to the selector 47. Thus, the setting information from the feature-value setting-information reader 63 is supplied to the reflecting unit 49, a process based on the setting information is reflected in the image of the frame, which is stored in the delay unit 48, and the processed image is displayed on the display unit 15.

The process in steps S1 to S4, S9 to S13, S7, and S8 corresponds to the operation in the playback mode described with reference to FIG. 2.

Figure 12:
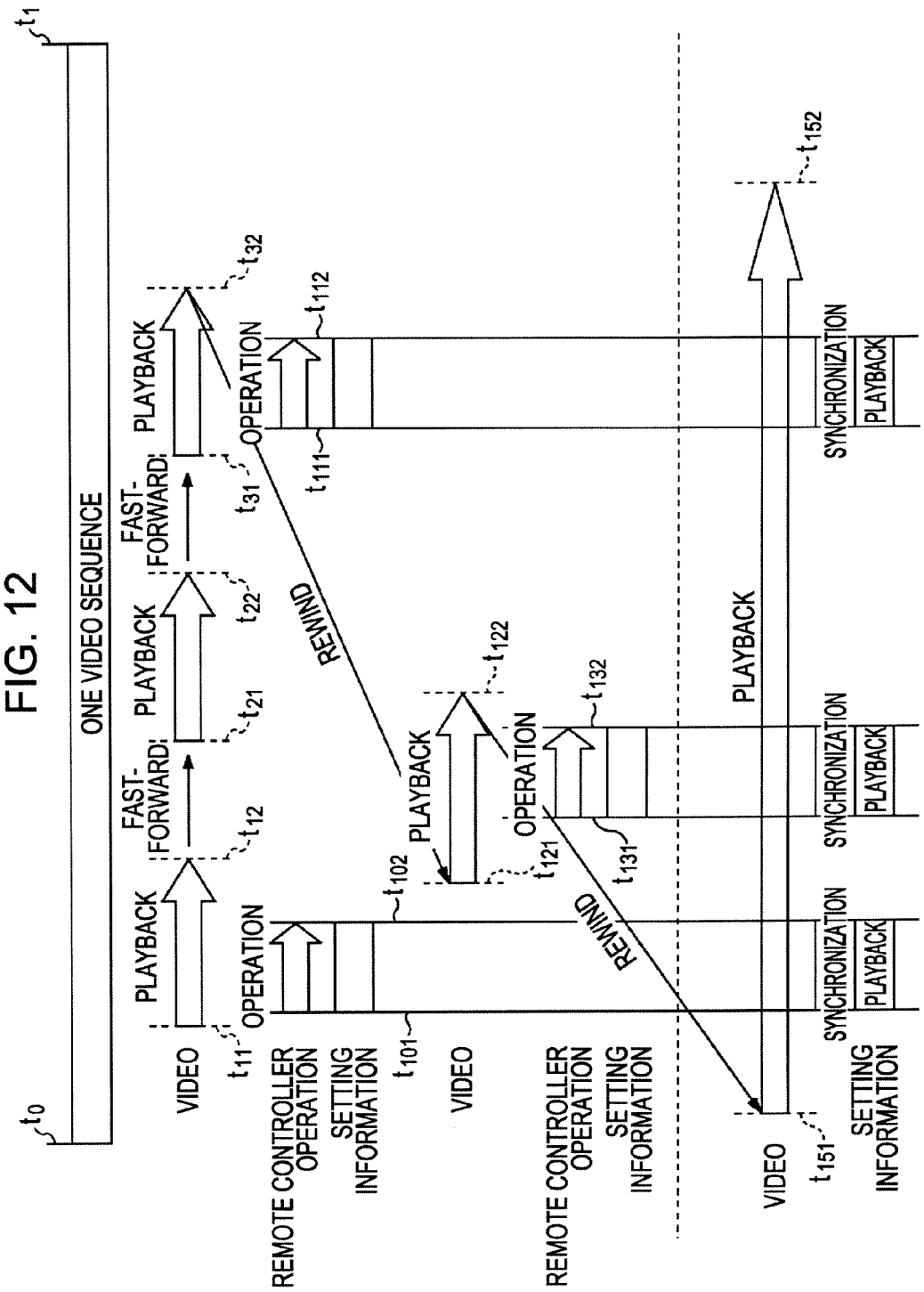
FIG. 12 is a chart describing the image processing operation performed by the image processing apparatus shown in FIG. 3.

With the above-described operation, for example, the operation shown in FIG. 12 is implemented. That is, when a video image sequence is recorded from time t0 to time t1 in advance in the recording medium 11, playback of the video sequence starts at time t11, which is subsequent to time t0. Thereafter, the user operates the remote controller 14 from time t101 to time t102 to specify a process to be applied to the image. At the same timing, a feature value and setting information associated with the feature value are stored in the feature-value setting-information storage unit 62.

At time t12, the video sequence is started to be fast-forwarded. After the second playback of the video sequence from time t21 to time t22, the video sequence is fast-forwarded to time t31. When playback of the video sequence starts at time t31, the user operates the remote controller 14 from time t111 to time t112 to specify a process to be applied to the image. At the same timing, a feature value and setting information associated with the feature value are stored in the feature-value setting-information storage unit 62.

The playback of the video sequence continues until time t32. Thereafter, the video sequence is rewound until time t121, and then playback of the video sequence starts. When the user operates the remote controller 14 from time t131 to time t132 to specify a process to be applied to the image, a feature value and setting information associated with the feature value are stored at the same timing in the feature-value setting-information storage unit 62.

Thereafter, the video sequence is rewound until time t151, which is in the vicinity of the beginning. When playback of the video sequence continues until time t152 during which the user does not operate the remote controller 14, synchronization position information is generated on the basis of the playback-position feature value at the timing from time t101 to time t102, from time t131 to time t132, and from time t111 to time t112, during which the user has operated the remote controller 14 to specify the process to be applied to the image. By reading setting information stored in association with the feature value of the synchronization position information, the process based on the setting information is reflected in the image.

In FIG. 12, the top row shows the scale of one video sequence from time t0 to time t1. The second row shows the first playback procedure in which normal playback is done from time t11 to time t12, from time t21 to time t22, and from time t31 to time t32, and fast-forwarding is done from time t12 to time t21 and from time t22 to time t31.

The third row shows the operation timing of the remote controller 14 during the first playback. The fourth row shows the timing of recording setting information during the first playback. In the third and fourth rows, the remote controller 14 is operated from time t101 to time t102 and from time t111 to time t112, and, at the same timing, setting information associated with the operation of the remote controller 14 is recorded. When the setting information is recorded, a process associated with the setting information is applied. Therefore, at the same time at which the remote controller 14 is operated, the image in which the user-desired process is reflected is displayed.

The fifth row shows the second playback procedure after the video sequence is rewound to time t121 subsequent to the end of the first playback procedure, during which normal playback is done from time t121 to time t122.

The sixth row shows the operation timing of the remote controller 14 during the second playback. The seventh row shows the timing of recording setting information during the second playback. In the sixth and seventh rows, the remote controller 14 is operated from time t131 to time t132, and, at the same timing, setting information associated with the operation of the remote controller 14 is recorded. When the setting information is recorded, a process associated with the setting information is applied. Therefore, at the same time at which the remote controller 14 is operated, the image in which the user-desired process is reflected is displayed.

The eighth row shows the third playback procedure after the video sequence is rewound to time t151 subsequent to the end of the second playback procedure, during which normal playback is done from time t151 to time t152.

The ninth row shows the timing of the synchronization detector 42 executing a synchronization process during the third playback. The tenth (bottom) row shows the timing of playing back setting information (reflecting setting information in the image) during the third playback. That is, the ninth and tenth rows show that, on the basis of the setting information recorded in response to operating the remote controller 14 during the first and second playbacks, the setting information recorded by operating the remote controller 14 is read and reflected in the image at the same timing, namely, from time t101 to time t102, from time t111 to time t112, and from time t131 to time t132.

The operation above the dotted lines in FIG. 12 corresponds to the recording mode shown in FIG. 1, and the operation below the dotted lines corresponds to the playback mode shown in FIG. 2.

With the above-described operation, when the user operates the remote controller 14 to give an instruction to apply a process to a pre-recorded image being played back, setting information indicating the details of the process is stored in association with a feature value of the designated image. Since the setting information is recorded in association with the feature value, when the pre-recorded image is played back, on the basis of the feature value of the image being played back, synchronization can be achieved with the stored feature value by using the feature value as a time code in units of frames. On the basis of the setting information associated with the synchronized feature value, the process can be reflected in the image being played back.

As a result, editing can be reflected in the image on the basis of the stored setting information without using time codes or the like. What is to be recorded are only the feature values and setting information, and no pre-recorded images will be recorded. Therefore, even a limited image such as a copy-once image can be edited and repeatedly played back.

In the above description, a feature value is the integrated value of pixel values in the image data region of an image signal within one frame. However, other types of feature values may be used. For example, a feature value may be a motion vector (full-screen motion and local motion), a value indicating the frequency of appearance of a specific waveform pattern, the integrated value of pixel values in a reduced image, the integrated value of pixel values in a specific part of the image, these values obtained using a plurality of frames, or a combination of these plural feature values.

Although the setting information has been described in terms of zoom magnification, the setting information may be of other types of information. For example, the setting information may be the zoom position (center position), zoom parameters including a combination of the zoom position and zoom magnification, image quality setting parameters such as brightness, contrast, gamma correction, and digital reality creation (DRC) palette values (resolution and noise settings), or audio parameters such as volume or voice switching (switching of the language being used).

In the above-described examples, when the remote controller 14 is operated, setting information in accordance with the details of the operation is stored in association with the feature value of the image. Alternatively, operation information indicating the details of the operation may be recorded.

Figure 13:
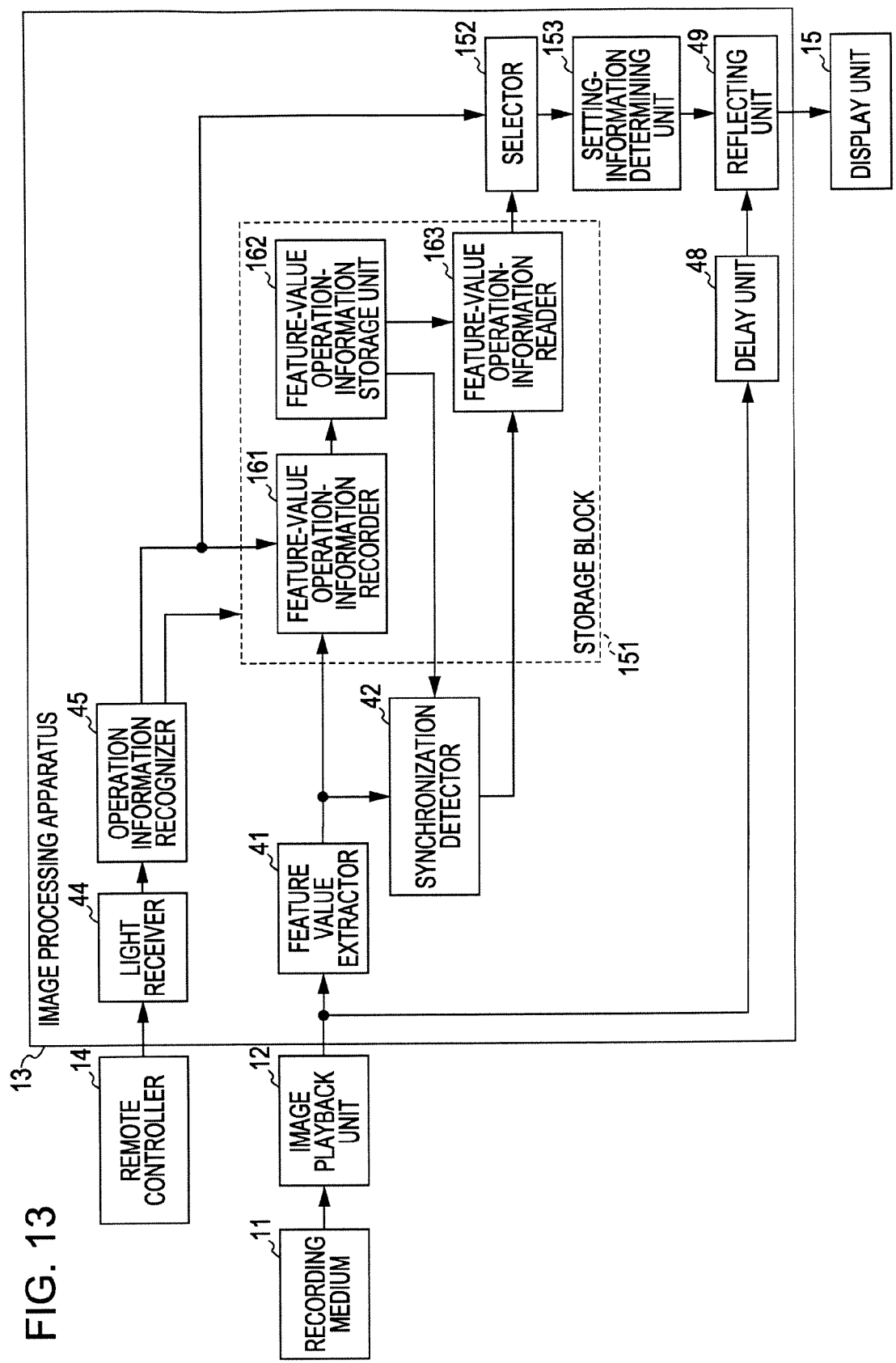
FIG. 13 is a block diagram of another exemplary structure of the image processing apparatus according to the embodiment of the present invention.

FIG. 13 shows an exemplary structure of the image processing apparatus 13 in which, instead of setting information, operation information is recorded in association with a feature value. In FIG. 13, the same reference numerals are used to denote the same components as those shown in FIG. 3, and repeated descriptions thereof are omitted where appropriate.

That is, the feature value extractor 41, the synchronization detector 42, the light receiver 44, the operation information recognizer 45, the delay unit 48, and the reflecting unit 49 are the same as those of the image processing apparatus 13 shown in FIG. 3. The image processing apparatus 13 shown in FIG. 13 differs from that shown in FIG. 3 in that, instead of the storage block 43, the setting-information determining unit 46, and the selector 47, a storage block 151, a setting-information determining unit 153, and a selector 152 are provided.

The storage block 151 stores operation information supplied from the operation information recognizer 45 in association with a feature value. In addition, the storage block 151 reads the stored operation information in association with a feature value of an image being played back and supplies the operation information to the selector 152.

A feature-value operation-information recorder 161 in the storage block 151 stores the feature value supplied from the feature value extractor 41 and the operation information supplied from the operation information recognizer 45 in association with each other in a feature-value operation-information storage unit 162.

When a feature-value operation-information reader 163 obtains the search-position feature value, namely, the feature value detected as the synchronization position by the synchronization detector 42, the feature-value operation-information reader 163 reads operation information stored in association with the feature value and supplies the operation information to the selector 152. When the operation information is supplied from the operation information recognizer 45, even if the operation information is supplied at the same time from the feature-value operation-information reader 163, the selector 152 supplies the operation information supplied from the operation information recognizer 45 to the setting-information determining unit 153. When no operation information is supplied from the operation information recognizer 45 and when the operation information is supplied from the feature-value operation-information reader 163, the selector 152 supplies the operation information supplied from the feature-value operation-information reader 163 to the setting-information determining unit 153. When no operation information is supplied from the operation information recognizer 45 or the feature-value operation-information reader 163, the selector 152 supplies no operation information to the setting-information determining unit 153.

On the basis of the operation information supplied from the selector 152, the setting-information determining unit 153 determines, for the reflecting unit 49, setting information for specifying the details of a process to be applied to the image and supplies the setting information to the reflecting unit 49.

Figure 14:
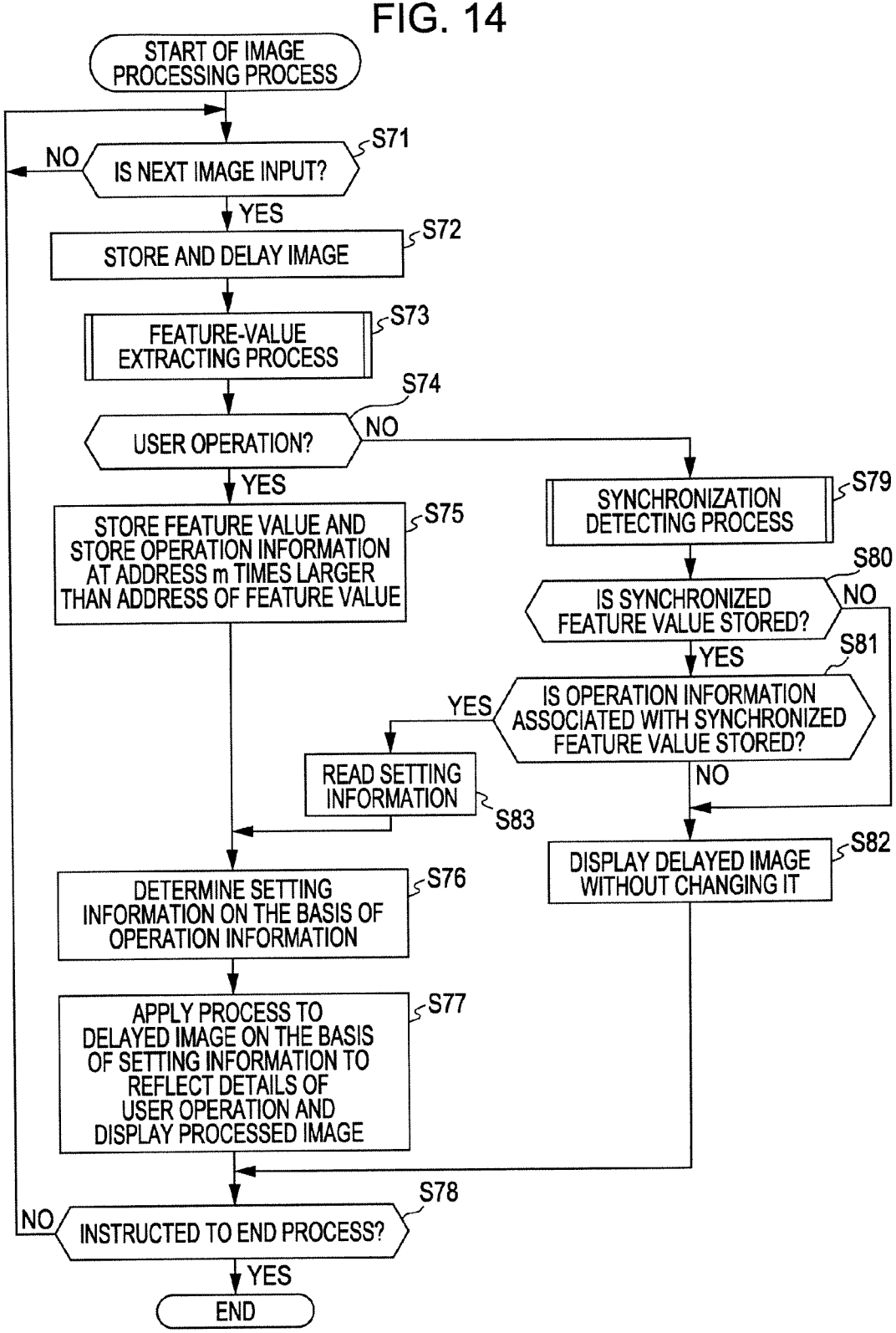
FIG. 14 is a flowchart of an image processing process performed by the image processing apparatus shown in FIG. 13.

Referring now to the flowchart of FIG. 14, an image processing process performed by the image processing apparatus 13 shown in FIG. 13 will be described. Since the process in steps S71 to S74, S78 to S80, and S82 of the flowchart shown in FIG. 14 is the same as the process in steps S1 to S4, S8 to S10, and S12 of the flowchart shown in FIG. 7, repeated descriptions thereof are omitted.

When the delay unit 48 stores an image supplied from the image playback unit 12, the feature value extractor 41 extracts a feature value of the image, and the user operates the remote controller 14, in step S75, the operation information recognizer 45 recognizes operation information on the basis of a signal supplied from the light receiver 44 and supplies the recognition result or the operation information to the feature-value operation-information recorder 161. The feature-value operation-information recorder 161 stores the feature value supplied from the feature value extractor 41 in the feature-value operation-information storage unit 162. At the same time, the feature-value operation-information recorder 161 stores, in association with the feature value, the operation information supplied from the operation information recognizer 45 in the feature-value operation-information storage unit 162. More specifically, as in the above-described setting information, as shown in FIG. 9, when the feature value C1 is recorded at the predetermined address A, operation information is stored, as in the setting information E1 associated with the feature value C1, at the address m times larger than the address A, that is, the address m×A.

In step S76, since the operation information is supplied from the operation information recognizer 45 to the selector 152, the selector 152 supplies the operation information supplied from the operation information recognizer 45 to the setting-information determining unit 153. On the basis of the supplied operation information, the setting-information determining unit 153 determines setting information and supplies the setting information to the reflecting unit 49.

In step S77, on the basis of the setting information supplied from the setting-information determining unit 153, the reflecting unit 49 applies a process to the image stored in the delay unit 48 to reflect in the image the process in accordance with the details of the user's instruction and displays the processed image on the display unit 15.

In contrast, when it is determined in step S74 that no user operation is performed, in step S79, the synchronization detecting process is performed. When it is determined in step S80 that the synchronized feature value is stored, in step S81, the feature-value operation-information reader 163 determines whether operation information associated with the synchronized feature value is stored in the feature-value operation-information storage unit 162. That is, a feature value may be stored in the feature-value operation-information storage unit 162 without being associated with operation information. Therefore, the presence of the operation information associated with the feature value is determined in step S81.

When it is determined in step S81 that, for example, no operation information associated with the feature value is stored, in step S82, the feature-value operation-information reader 163 supplies no operation information to the selector 152. With this operation, no operation information is supplied from the operation information recognizer 45 or the feature-value operation-information reader 163 to the selector 152, and hence no operation information for specifying setting information is supplied to the setting-information determining unit 153. As a result, no setting information for specifying the process is supplied to the reflecting unit 49. The reflecting unit 49 thus displays the image of the frame, which is temporarily stored in the delay unit 48, on the display unit 15 without changing the image.

In contrast, when it is determined in step S81 that, for example, the operation information associated with the feature value is stored, in step S83, the feature-value operation-information reader 163 reads the operation information stored in association with the feature value of the synchronization position information from the feature-value operation-information storage unit 162 and supplies the operation information to the selector 152. The flow proceeds to step S76.

With the above-described operation, the operation information indicating the details of the operation of the remote controller 14 is recorded in association with the feature value of the image. Accordingly, editing based on the stored setting information can be reflected in the image without using time codes or the like.

In the above description, the operation information is the absolute value that has a one-to-one correspondence with the setting information. That is, when the operation information indicates 2× zoom, the setting information indicates 2× zoom. When the magnification is changed, the operation information and setting information still have a one-to-one correspondence such that, when the operation information indicates 3× zoom, the setting information also indicates 3× zoom. However, when the operation information specifies a relative value with respect to the current setting information, the immediately preceding setting information becomes necessary. That is, when the current setting information indicates 2× zoom and when the operation information indicates 2× zoom, the setting information is set to 4× zoom (=2× zoom×2× zoom) on the basis of the operation information. Furthermore, when 2× zoom is specified by the operation information, the setting information is set to 8× zoom (=4× zoom×2× zoom). In this manner, when the operation information specifies a relative value, the operation information and setting information do not have a one-to-one correspondence. To set new setting information, besides the operation information, the immediately preceding setting information is necessary. Therefore, when the remote controller 14 is operated to supply operation information, the operation information and the immediately preceding setting information may be stored in association with the feature value.

FIG. 15 shows an exemplary structure of the image processing apparatus 13 in which operation information including a relative value and immediately preceding setting information are stored in association with a feature value. In the image processing apparatus 13 shown in FIG. 15, the same reference numerals are used to denote the same components as those shown in FIG. 13, and repeated descriptions thereof are omitted where appropriate.

That is, the feature value extractor 41, the synchronization detector 42, the light receiver 44, the operation information recognizer 45, the delay unit 48, and the reflecting unit 49 are the same as those of the image processing apparatus 13 shown in FIG. 13. The image processing apparatus 13 shown in FIG. 15 differs from that shown in FIG. 13 in that, instead of the storage block 151, the selector 152, and the setting-information determining unit 153, a storage block 181, a selector 182, and a setting-information determining unit 183 are provided, and the setting information supplied from the setting-information determining unit 183 is supplied as the immediately preceding setting information to the storage block 181.

The storage block 181 stores operation information supplied from the operation information recognizer 45 in association with a feature value. At the same time, the storage block 181 stores immediately preceding setting information in association with the feature value. In addition, the storage block 181 reads the operation information and immediately preceding setting information, which are stored in association with the feature value, in association with a feature value of an image being played back and supplies the operation information and immediately preceding setting information to the selector 182.

A feature-value operation-information recorder 191 in the storage block 181 stores the operation information supplied from the operation information recognizer 45 and the immediately preceding setting information stored in a memory 183a of the setting-information determining unit 183 in association with the feature value supplied from the feature value extractor 41 in a feature-value operation-information storage unit 192.

When a feature-value operation-information reader 193 obtains the feature value (the search-position feature value) detected as the synchronization position by the synchronization detector 42, the feature-value operation-information reader 193 reads operation information and immediately preceding setting information, which are stored in association with the feature value, and supplies the operation information and immediately preceding setting information to the selector 182. When the operation information is supplied from the operation information recognizer 45, the selector 182 supplies this operation information to the setting-information determining unit 183. When no operation information is supplied from the operation information recognizer 45 and when the operation information and immediately preceding setting information are supplied from the feature-value operation-information reader 193, the selector 182 supplies the operation information and immediately preceding setting information supplied from the feature-value operation-information reader 193 to the setting-information determining unit 183. When no operation information is supplied from any component, the selector 182 supplies no operation information to the setting-information determining unit 183.

When only the operation information is supplied from the selector 182, that is, when the operation information directly supplied from the operation information recognizer 45 is supplied from the selector 182, the setting-information determining unit 183 determines the next setting information on the basis of the immediately preceding setting information stored in the memory 183a and the supplied operation information, supplies the next setting information to the reflecting unit 49, and updates the immediately preceding setting information in the memory 183a to the next setting information.

When the operation information and immediately preceding setting information are supplied from the selector 182, that is, when the operation information and immediately preceding setting information, which are stored in association with the feature value in the feature-value operation-information storage unit 192, are supplied from the feature-value operation-information reader 193, the setting-information determining unit 183 determines setting information for specifying the details of a process to be applied to the image on the basis of the operation information and immediately preceding setting information, supplies the setting information to the reflecting unit 49, and updates the immediately preceding setting information in the memory 183a to the next setting information.

Figure 16:
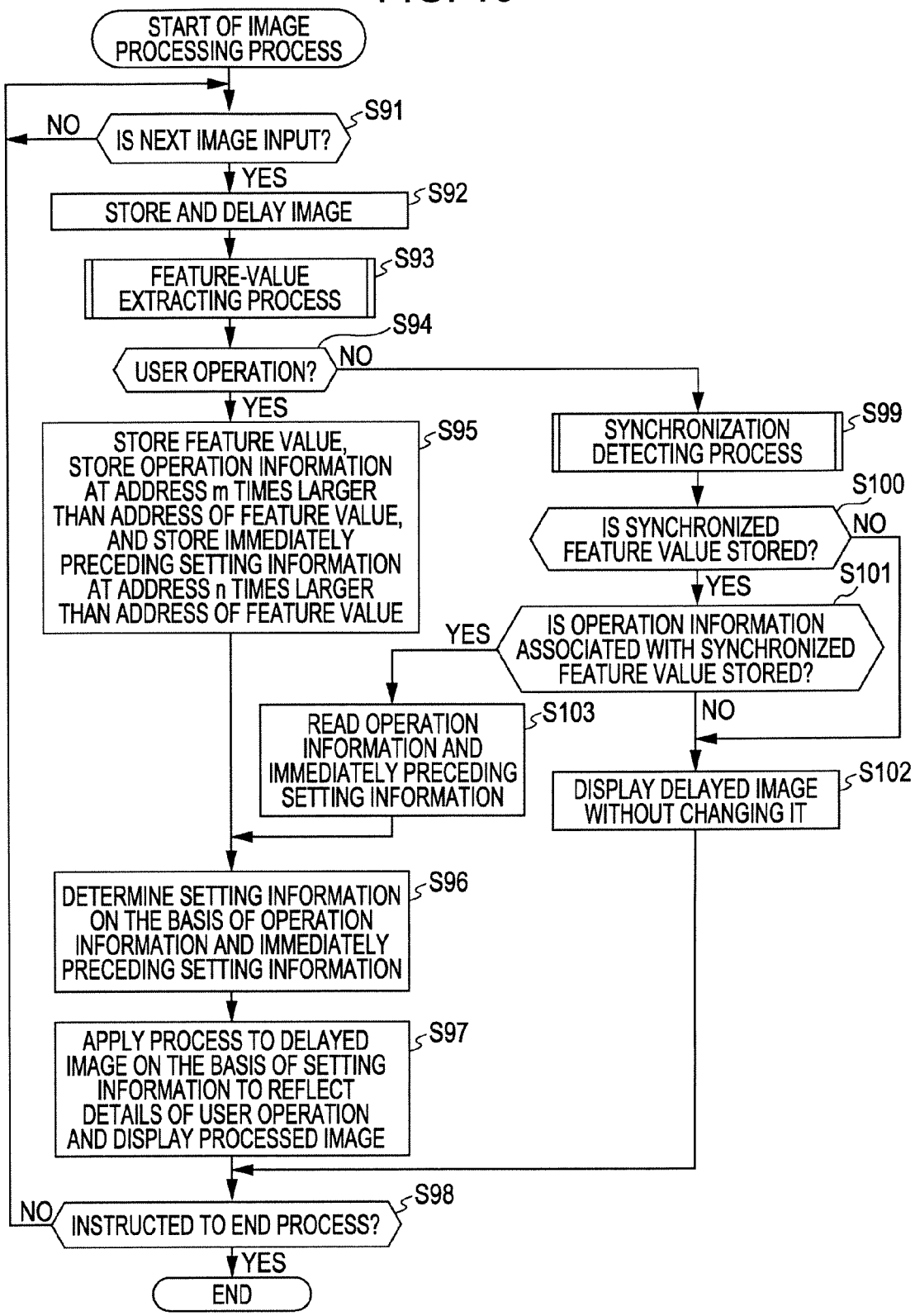
FIG. 16 is a flowchart of an image processing process performed by the image processing apparatus shown in FIG. 15.

Referring now to the flowchart of FIG. 16, an image processing process performed by the image processing apparatus 13 shown in FIG. 15 will be described. Since the process in steps S91 to S94, S98 to S100, and S102 of the flowchart shown in FIG. 16 is the same as the process in steps S71 to S74, S78 to S80, and S82 of the flowchart shown in FIG. 14, repeated descriptions thereof are omitted.

When the delay unit 48 stores an image supplied from the image playback unit 12, the feature value extractor 41 extracts a feature value of the image, and the user operates the remote controller 14, in step S95, the operation information recognizer 45 recognizes operation information on the basis of a signal supplied from the light receiver 44 and supplies the recognition result or the operation information to the feature-value operation-information recorder 191. The feature-value operation-information recorder 191 stores, in association with the feature value supplied from the feature value extractor 41, the operation information supplied from the operation information recognizer 45 and the immediately preceding setting information stored in the memory 183a of the setting-information determining unit 183 in the feature-value operation-information storage unit 192. More specifically, as in the above-described setting information, as shown in FIG. 9, when the feature value C1 is recorded at the predetermined address A, the operation information is stored, as in the setting information E1 associated with the feature value C1, at the address m times larger than the address A, that is, the address m×A, and the immediately preceding setting information is stored at the address n times larger the address A, that is, the address n×A.

In step S96, since the operation information is supplied from the operation information recognizer 45 to the selector 182 and, in this case, only the operation information is supplied from the selector 182 to the setting-information determining unit 183, the setting-information determining unit 183 determines the next setting information on the basis of the immediately preceding setting information stored in the memory 183a and the supplied operation information and supplies the next setting information to the reflecting unit 49.

In step S97, on the basis of the setting information supplied from the setting-information determining unit 183, the reflecting unit 49 applies a process to the image stored in the delay unit 48 to reflect in the image the process in accordance with the details of the user's instruction and displays the processed image on the display unit 15.

In contrast, when it is determined in step S94 that no user operation is performed, in step S99, the synchronization detecting process is performed. When it is determined in step S100 that the synchronized feature value is stored, in step S101, the feature-value operation-information reader 193 determines whether operation information and immediately preceding setting information that are associated with the synchronized feature value are stored in the feature-value operation-information storage unit 192. That is, a feature value may be stored in the feature-value operation-information storage unit 192 without being associated with operation information and immediately preceding setting information. Therefore, the presence of the operation information and the immediately preceding setting information associated with the feature value is determined in step S101.

When it is determined in step S101 that, for example, no operation information or immediately preceding setting information associated with the feature value is stored, in step S102, the feature-value operation-information reader 193 supplies no operation information or no immediately preceding setting information to the selector 182. With this operation, no operation information is supplied from the operation information recognizer 45 or no operation information or immediately preceding setting information is supplied from the feature-value operation-information reader 193 to the selector 182, and hence no operation information for determining the setting information or no operation information or immediately preceding setting information for setting the setting information is supplied to the setting-information determining unit 183. As a result, no setting information for specifying a process is supplied to the reflecting unit 49. The reflecting unit 49 thus displays the image of the frame, which is temporarily stored in the delay unit 48, on the display unit 15 without changing the image.

In contrast, when it is determined in step S101 that, for example, the operation information and setting information associated with the feature value are stored, in step S103, the feature-value operation-information reader 193 reads the operation information and immediately preceding setting information stored in association with the feature value of the synchronization position information from the feature-value operation-information storage unit 192 and supplies the operation information and immediately preceding setting information to the selector 182. The flow proceeds to step S96.

Figure 17:
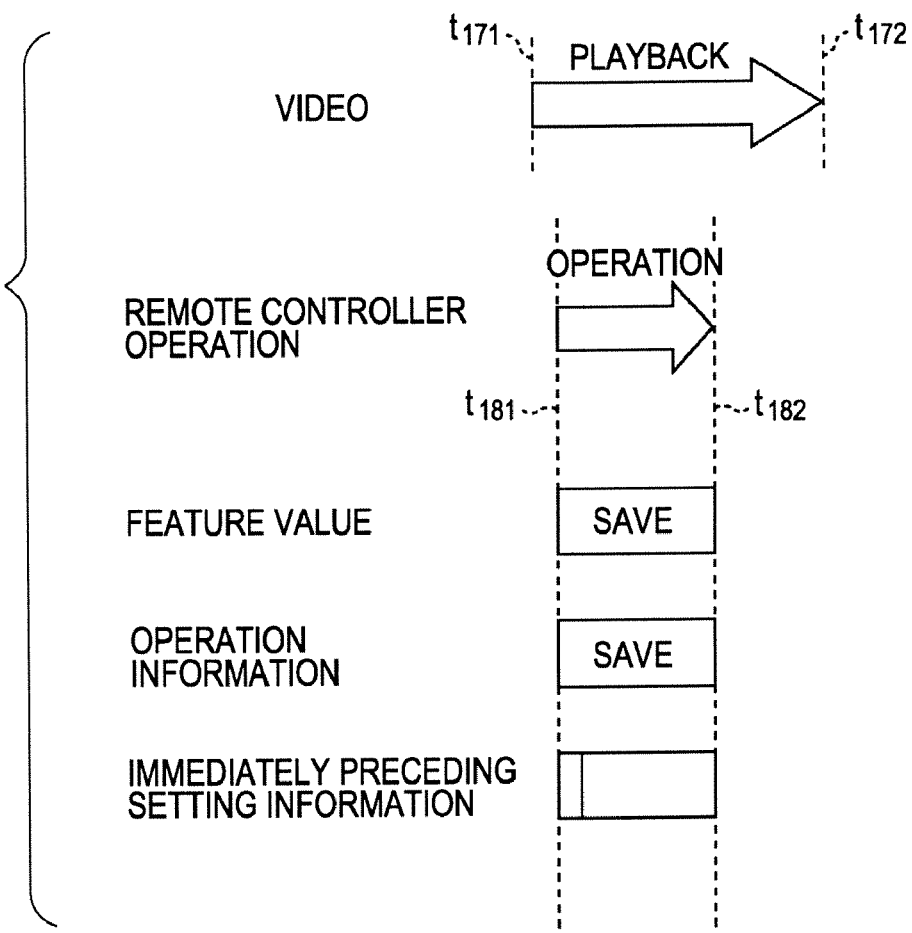
FIG. 17 is a chart describing the image processing operation performed by the image processing apparatus shown in FIG. 15.

With the above-described operation, as shown in FIG. 17, when a video (image) sequence recorded in the recording medium 11 is played back by the image playback unit 12 from time t171 to time t172 during which the remote controller 14 is operated from time t181 to time t182 to give an instruction to apply a predetermined process to the image, the feature value of the image is stored at the same timing, and, in association with the feature value, operation information and immediately preceding setting information are recorded. As a result, even when the operation information indicating the details of the operation of the remote controller 14 is a relative value with respect to the immediately preceding setting information, when the setting information is determined, the operation information and immediately preceding setting information are stored in association with the feature value. When the image recorded in the recording medium 11 is played back without operating the remote controller 14, the process based on the setting information determined on the basis of the operation information and immediately preceding setting information stored in association with the feature value is reflected in the image being played back.

That is, even when the operation information indicating the details of the operation of the remote controller 14 is a relative value with respect to the immediately preceding setting information, the supplied operation information of the remote controller 14 is recorded in association with the feature value of the image. Accordingly, editing based on the stored setting information can be reflected in the image without using time codes or the like.

In the above description, the setting information, the operation information, or the combination of the operation information and immediately preceding setting information is stored in association with the address of the feature value. However, since it is only necessary that the setting information, the operation information, or the combination of the operation information and immediately preceding setting information be managed in association with the feature value, a management method other than that using the address in the memory may be used. For example, the stored information may be managed as a table.

FIG. 18 shows the image processing apparatus 13 in which the setting information is managed as a table in association with the feature value. In the image processing apparatus 13 shown in FIG. 18, the same reference numerals are used to denote the same components as those shown in FIG. 3, and repeated descriptions thereof are omitted where appropriate.

That is, the feature value extractor 41, the synchronization detector 42, the light receiver 44, the operation information recognizer 45, the setting-information determining unit 46, the selector 47, the delay unit 48, and the reflecting unit 49 are the same as those of the image processing apparatus 13 shown in FIG. 3. The image processing apparatus 13 shown in FIG. 18 differs from that shown in FIG. 3 in that, instead of the storage block 43, a storage block 201 is provided.

A feature-value setting-information recorder 211 in the storage block 201 stores the feature value supplied from the feature value extractor 41 and the setting information supplied from the setting-information determining unit 46 in association with each other in a feature-value setting-information table storage unit 212.

When a feature-value setting-information reader 213 obtains the feature value (the search-position feature value) detected as the synchronization position by the synchronization detector 42, the feature-value setting-information reader 213 reads setting information stored in association with the feature value in the feature-value setting-information table storage unit 212 and supplies the setting information to the selector 47.

Figure 19:
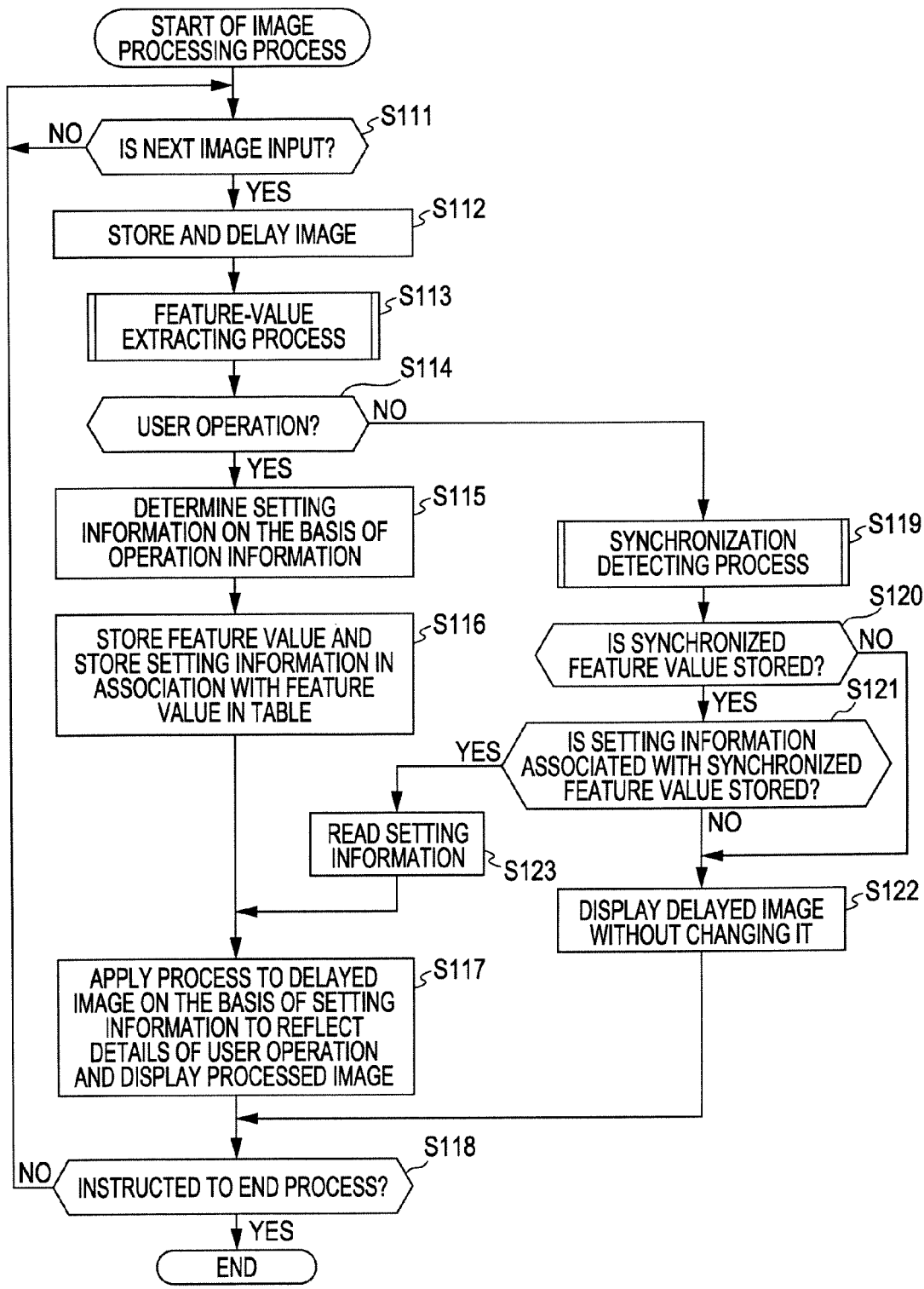
FIG. 19 is a flowchart of an image processing process performed by the image processing apparatus shown in FIG. 18.

Referring now to the flowchart of FIG. 19, an image processing process performed by the image processing apparatus 13 shown in FIG. 18 will be described. Since the process in steps S111 to S115, S117 to S119, S122, and S123 of the flowchart shown in FIG. 19 is the same as the process in steps S1 to S5, S7 to S9, S12, and S13 of the flowchart shown in FIG. 7, repeated descriptions thereof are omitted.

In step S116, the feature-value setting-information recorder 211 stores the feature value supplied from the feature value extractor 41 in the feature-value setting-information table storage unit 212, and, in association with the feature value, stores the setting information supplied from the setting-information determining unit 46 in the feature-value setting-information table storage unit 212.

That is, the feature-value setting-information table storage unit 212 is a table such as that shown in FIG. 20. Referring to FIG. 20, feature values are recorded in the left column, and setting information is recorded in the right column. From the top, the setting information "2× zoom" is recorded in association with the feature value "00011100". Similarly, the setting information "3× zoom" is recorded in association with the feature value "00011101"; the setting information "4× zoom" is recorded in association with the feature value "00011010"; the setting information "5× zoom" is recorded in association with the feature value "01011101"; the setting information "6× zoom" is recorded in association with the feature value "00110100"; the setting information "7× zoom" is recorded in association with the feature value "00110110"; the setting information "8× zoom" is recorded in association with the feature value "10011010"; the setting information "9× zoom" is recorded in association with the feature value 101011101; no setting information is recorded in association with the feature value "00100100"; no setting information is recorded in association with the feature value "00110110"; the setting information "7× zoom" is recorded in association with the feature value "10011010"; and the setting information "6× zoom" is recorded in association with the feature value "01011101".

In step S120, the feature-value setting-information reader 213 determines whether the playback-position feature value of the frame being played back matches any of the feature values stored in the feature-value setting-information table storage unit 212.

In step S121, the feature-value setting-information reader 213 determines whether setting information associated with the synchronized feature value is stored in the feature-value setting-information table storage unit 212.

Accordingly, using the table storing setting information and a feature value in association with each other, editing based on the stored setting information can be reflected in the image without using time codes or the like. Alternatively, a table storing operation information associated with a feature value or a table storing operation information and immediately preceding setting information associated with a feature value may be used.

The above-described feature value may be recorded without being associated with the setting information, the operation information, or the combination of the operation information and immediately preceding setting information. In the above description, however, the setting information, the operation information, or the combination of the setting operation and immediately preceding setting information is recorded when the remote controller 14 is operated. Alternatively, such information may be recorded at a different timing.

Figure 21:
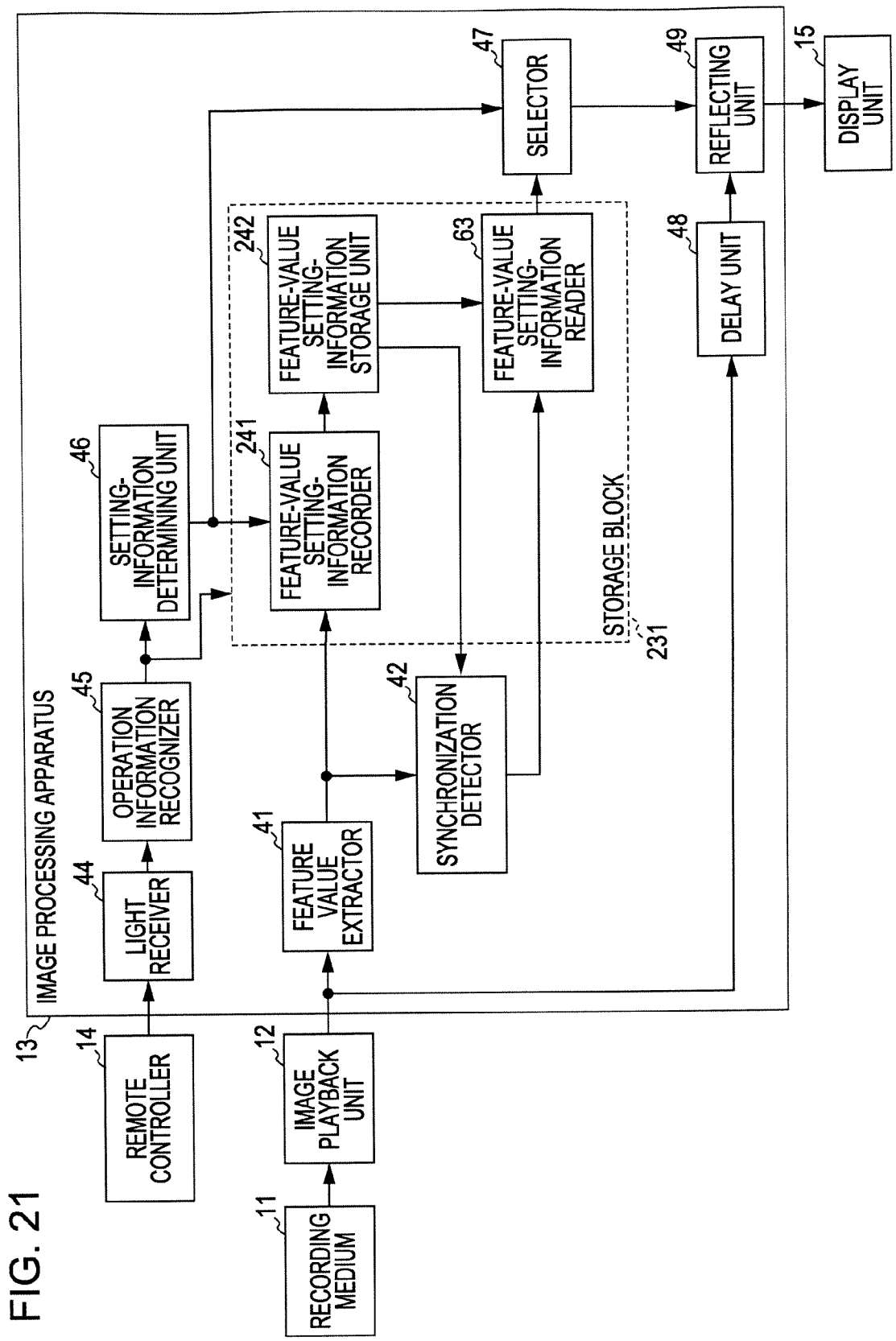
FIG. 21 is a block diagram of yet another exemplary structure of the image processing apparatus according to the embodiment of the present invention.

FIG. 21 shows an exemplary structure of the image processing apparatus 13 in which, before the remote controller 14 gives an instruction to apply a process to an image, all the images recorded in the recording medium 11 are stored by being formatted in advance. In FIG. 21, the same reference numerals are used to denote the same components as those shown in FIG. 3, and repeated descriptions thereof are omitted.

That is, the feature value extractor 41, the synchronization detector 42, the light receiver 44, the operation information recognizer 45, the setting-information determining unit 46, the selector 47, the delay unit 48, and the reflecting unit 49 are the same as those of the image processing apparatus 13 shown in FIG. 3. The image processing apparatus 13 shown in FIG. 21 differs from that shown in FIG. 3 in that, instead of the storage block 43, a storage block 231 is provided.

A feature-value setting-information recorder 241 in the storage block 231 basically has a function similar to that of the feature-value setting-information recorder 61. In addition, when a format command is given from the operation information recognizer 45, the feature-value setting-information recorder 241 stores the feature values of all images recorded in the recording medium 11 to be played back by the image playback unit 12 in a feature-value setting-information storage unit 242.

Figure 22:
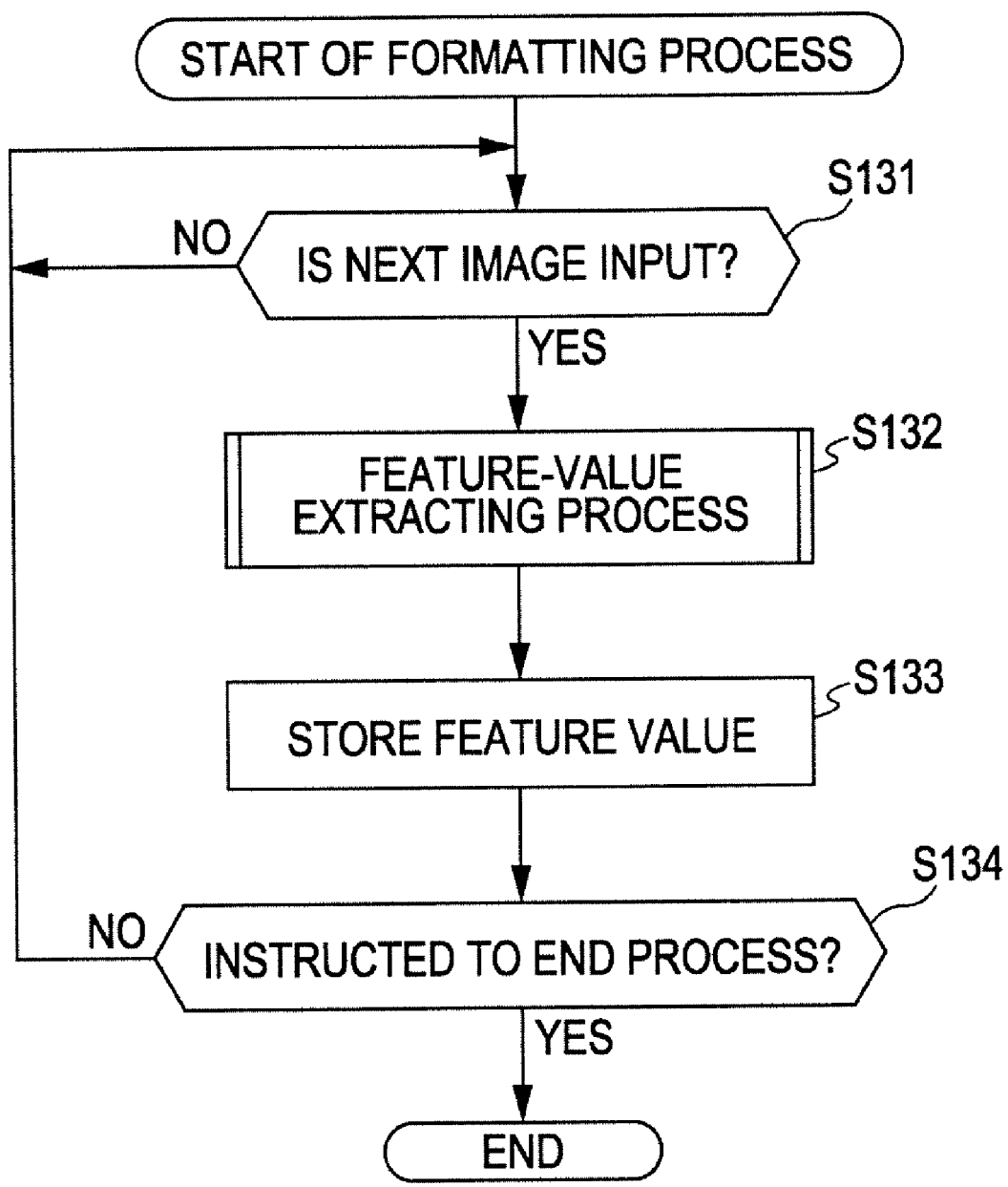
FIG. 22 is a flowchart of a formatting process performed by the image processing apparatus shown in FIG. 21.

Referring now to the flowchart of FIG. 22, a formatting process performed by the image processing apparatus 13 shown in FIG. 21 will be described.

In step S131, the feature value extractor 41 determines whether a new image is supplied from the image playback unit 12. This determination is repeated until a new image is supplied. When it is determined in step S131 that a new image is supplied, in step S132, the feature value extractor 41 performs a feature-value extracting process to extract a feature value of the image and supplies the feature value to the feature-value setting-information recorder 241. Since the feature-value extracting process is the same as that shown in the flowchart of FIG. 8, a repeated description thereof is omitted.

In step S133, the feature-value setting-information recorder 241 stores the supplied feature value in the feature-value setting-information storage unit 242.

In step S134, the feature-value setting-information recorder 241 determines whether an instruction is given to end the formatting process. If no such instruction is given, the flow returns to step S131. That is, the process from step S131 to step S134 is repeated until an instruction to end the formatting process is given. When such an instruction is given, the formatting process ends.

Figure 23:
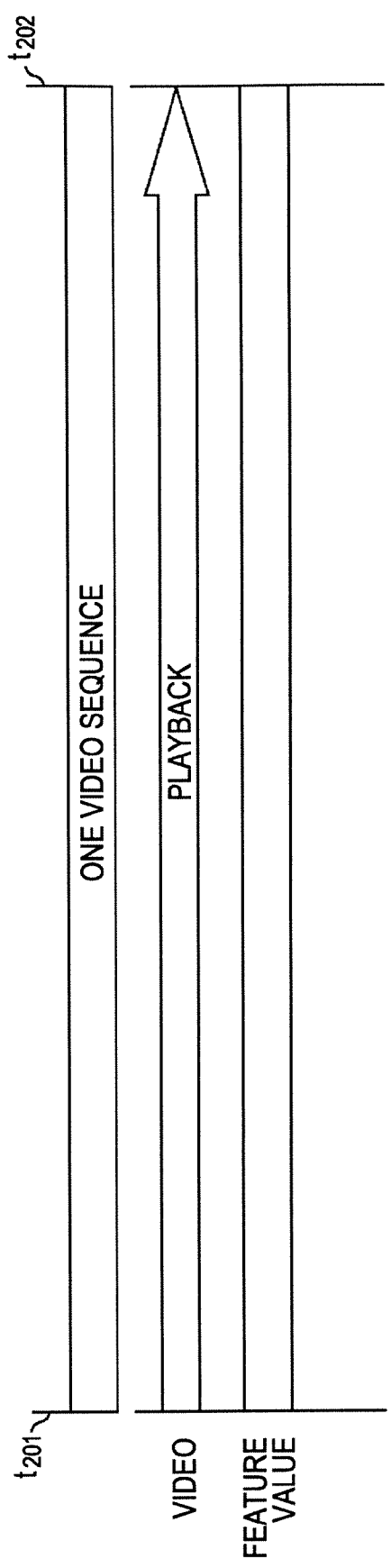
FIG. 23 is a chart describing the formatting process performed by the image processing apparatus shown in FIG. 21.

With the above-described operation, as shown in FIG. 23, for example, when a video (image) sequence ranges from time t201 to time t202, and when playback of the video sequence starts from the beginning, the feature values from the beginning to the end are stored. As a result, it becomes unnecessary to record an additional feature value when setting information, operation information, or a combination of operation information and immediately preceding setting information is recorded.

In FIG. 23, the top row shows the time of the video image sequence. The second row shows the playback timing. The third row shows the timing of recording the feature values.

In the above description, the feature values of all the images of the entire video sequence are obtained at the beginning of the process. Alternatively, only the feature values of part of the video sequence may be recorded during playback of the images recorded in the recording medium 11 by the image playback unit 12 without the remote controller 14 being operated.

Figure 24:
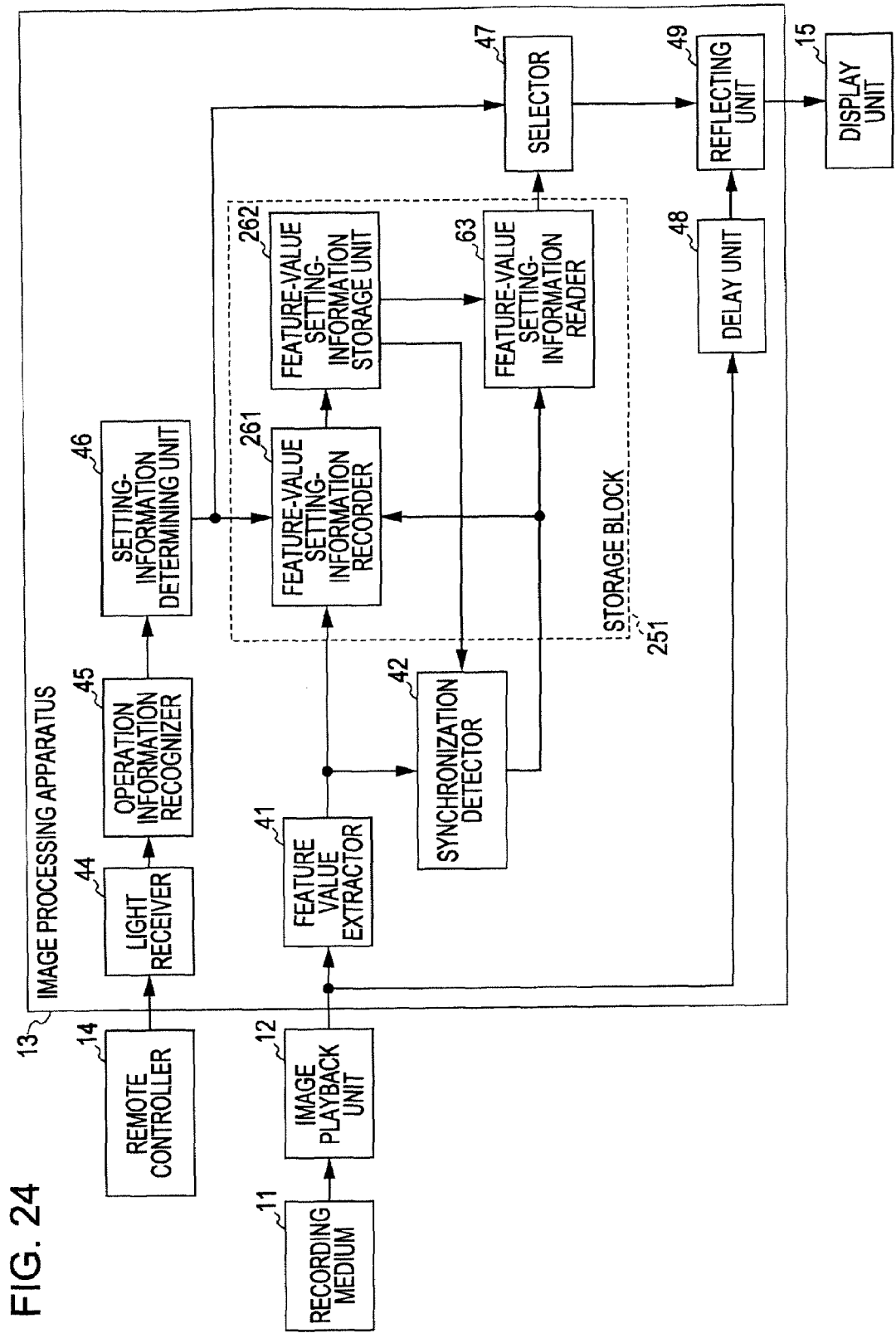
FIG. 24 is a block diagram of yet another exemplary structure of the image processing apparatus according to the embodiment of the present invention.

FIG. 24 shows an exemplary structure of the image processing apparatus 13 in which only the feature values of part of the video sequence are recorded during playback of the images recorded in the recording medium 11 without the remote controller 14 being operated. In FIG. 24, the same reference numerals are used to denote the same components as those shown in FIG. 3, and repeated descriptions thereof are omitted where appropriate.

That is, the feature value extractor 41, the synchronization detector 42, the light receiver 44, the operation information recognizer 45, the setting-information determining unit 46, the selector 47, the delay unit 48, and the reflecting unit 49 are the same as those of the image processing apparatus 13 shown in FIG. 3. The image processing apparatus 13 shown in FIG. 24 differs from that shown in FIG. 3 in that, instead of the storage block 43, a storage block 251 is provided.

A feature-value setting-information recorder 261 in the storage block 251 basically has a function similar to that of the feature-value setting-information recorder 61. In addition, the feature-value setting-information recorder 261 stores the feature values of the images in a feature-value setting-information storage unit 262 when no operation information is supplied from the operation information recognizer 45, when the images recorded in the recording medium 11 are played back by the image playback unit 12, and when no search-position feature value serving as the synchronization detection result is supplied from the synchronization detector 42, that is, when no feature value is recorded.

Figure 25:
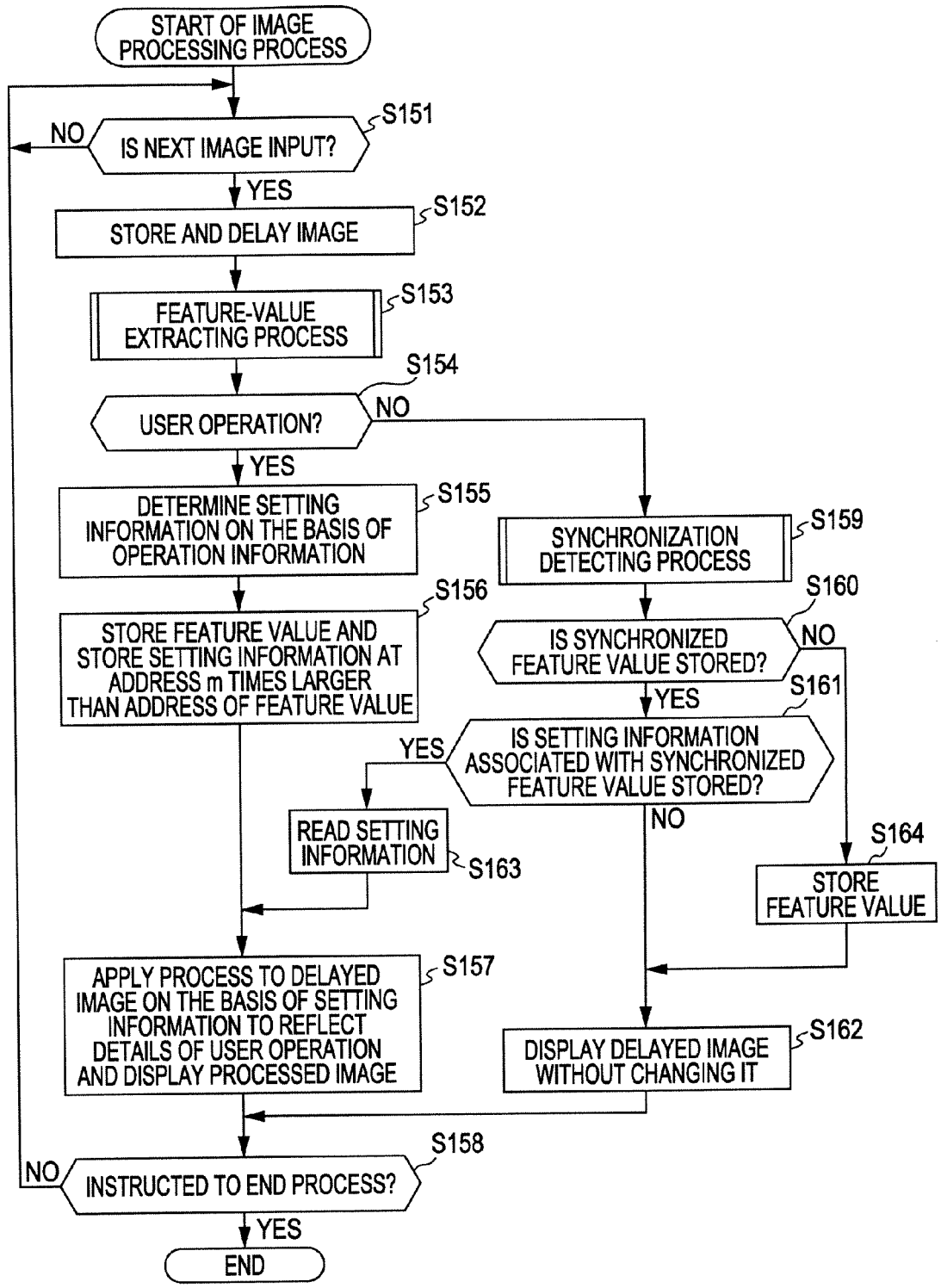
FIG. 25 is a flowchart of an image processing process performed by the image processing apparatus shown in FIG. 24.

Referring now to the flowchart of FIG. 25, an image processing process performed by the image processing apparatus 13 shown in FIG. 24 will be described. Since the process in steps S151 to S163 of the flowchart shown in FIG. 25 is the same as the process in steps S1 to S13 of the flowchart shown in FIG. 7, repeated descriptions thereof are omitted.

That is, when it is determined in step S160 that no synchronized feature value is stored, in step S164, the feature-value setting-information recorder 261 stores only the feature value supplied from the feature value extractor 41 in the feature-value setting-information storage unit 262.

Figure 26:
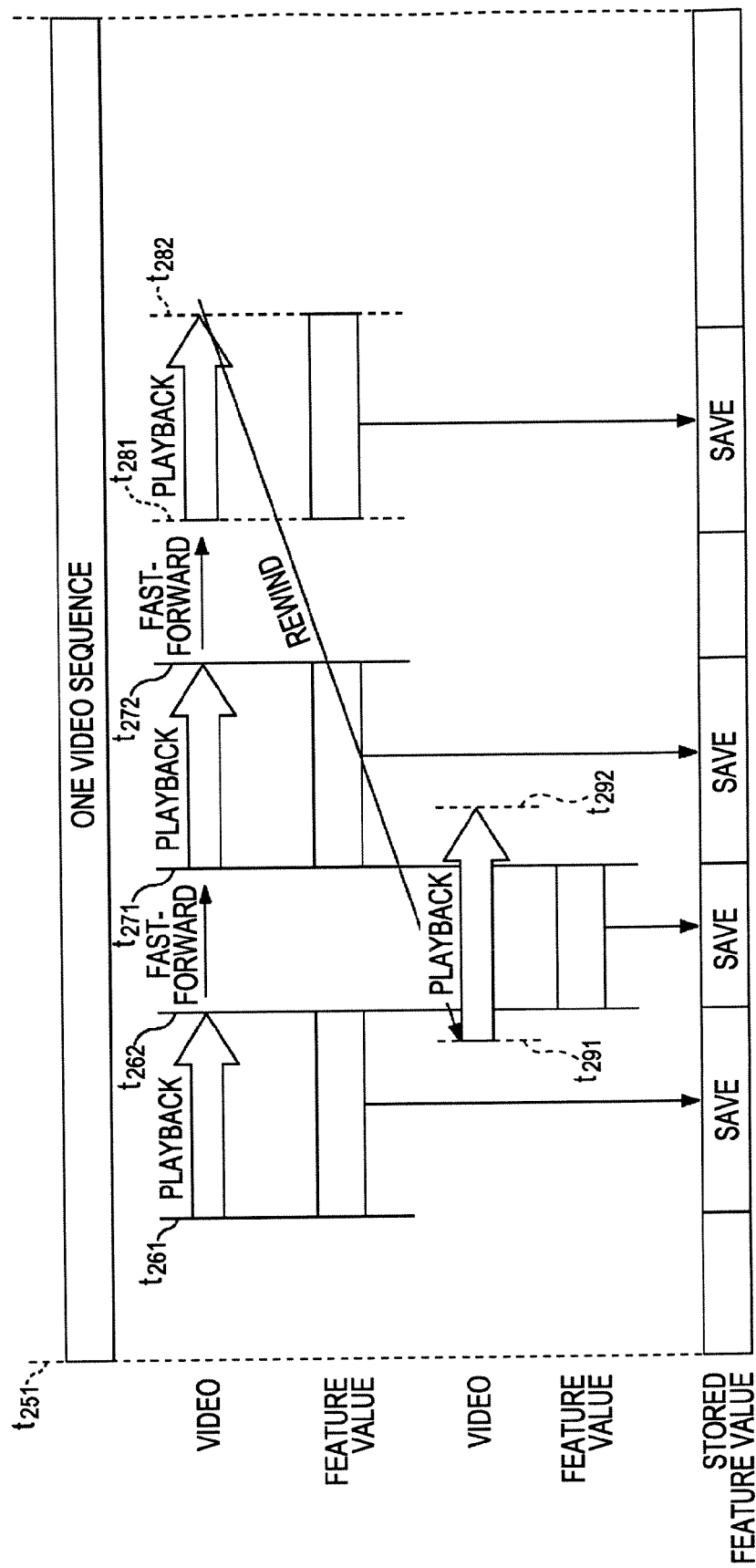
FIG. 26 is a chart describing the image processing operation performed by the image processing apparatus shown in FIG. 24.

With the above-described operation, for example, as shown in FIG. 26, when a video (image) sequence is recorded from time t251 to time t252, and when the video sequence is played back from time t261 to time t262 in a state where no instruction is given by operating the remote controller 14, the feature value is recorded at that timing. Thereafter, the video sequence is fast forwarded from time t262 to time t271 and played back from time t271 to time t272, during which no instruction is given by operating the remote controller 14, and the feature value is again recorded at that timing. Thereafter, the video sequence is fast forwarded from time t272 to time t281 and played back from time t281 to time t282, during which no instruction is given by operating the remote controller 14, and the feature value is again recorded at that timing.

When the video sequence is rewound from time t282 to time t291, since the feature value has already been recorded from time t291 to time t262, the feature value is recorded from time t262 to t271, which is the period during which no feature value is recorded, provided that no instruction is given by operating the remote controller 14. Again, since the feature value is recorded from time t271 to time t292, the recording of the feature value is stopped. The video sequence is played back in accordance with the timing shown in FIG. 26, and the feature value is recorded from time t261 to time t272 and from time t281 to time t282.

As a result, the feature values of part of the video sequence are gradually stored during the normal playback provided that no instruction to process the image is given by operating the remote controller 14. The feature values can be stored without making the user recognize the formatting process and the like.

As has been described above, according to the image processing apparatus and method and the program therefor of the first embodiment of the present invention, a feature value is extracted from an image, setting information for applying a process to the image is set, and the setting information is recorded in association with the feature value of the image in a data recording medium.

According to the data recording medium of the second embodiment of the present invention, the data recording medium has a data structure in which setting information for applying a process to an image is recorded in association with a feature value of the image.

According to the image processing apparatus and method and the program therefor of the third embodiment of the present invention, a feature value at a playback position is extracted as a playback-position feature value from an image at the playback position. The playback-position feature value is synchronized with a feature value in a data recording medium having recorded therein setting information for applying a process to the image in association with a feature value of the image. When synchronization is achieved between the feature value recorded in the data recording medium and the playback-position feature value, the setting information recorded in associated with the synchronized playback-position feature value is read from the data recording medium, and a process based on the read setting information is reflected in the image at the playback position.

As a result, according to the first embodiment of the present invention, setting information for applying a process to an image can be recorded in association with a feature value of the image.

According to the second embodiment of the present invention, setting information for processing an image can be recorded, without recording the result of processing the image, in association with a feature value of the image.

According to the third embodiment of the present invention, setting information for processing an image can be read in association with a feature value of the image, and the process can be reflected in the image on the basis of the setting information.

In any of the embodiments, a feature value is extracted in units of frames, and the feature value is used as a time code. In this way, every time an image is played back, a predetermined process can be accurately applied to the image without applying the process to the original image data. Even in the case of image data that is prohibited from being copied, the same process can be applied to the image every time the image is played back and the image can be repeatedly played back.

The series of processes described above can be performed using hardware or software. If software is used for this series of processes, a program constituting the software is installed from a recording medium on a computer installed in dedicated hardware or, for example, a general-purpose personal computer capable of performing various functions by installing various programs.

Figure 27:
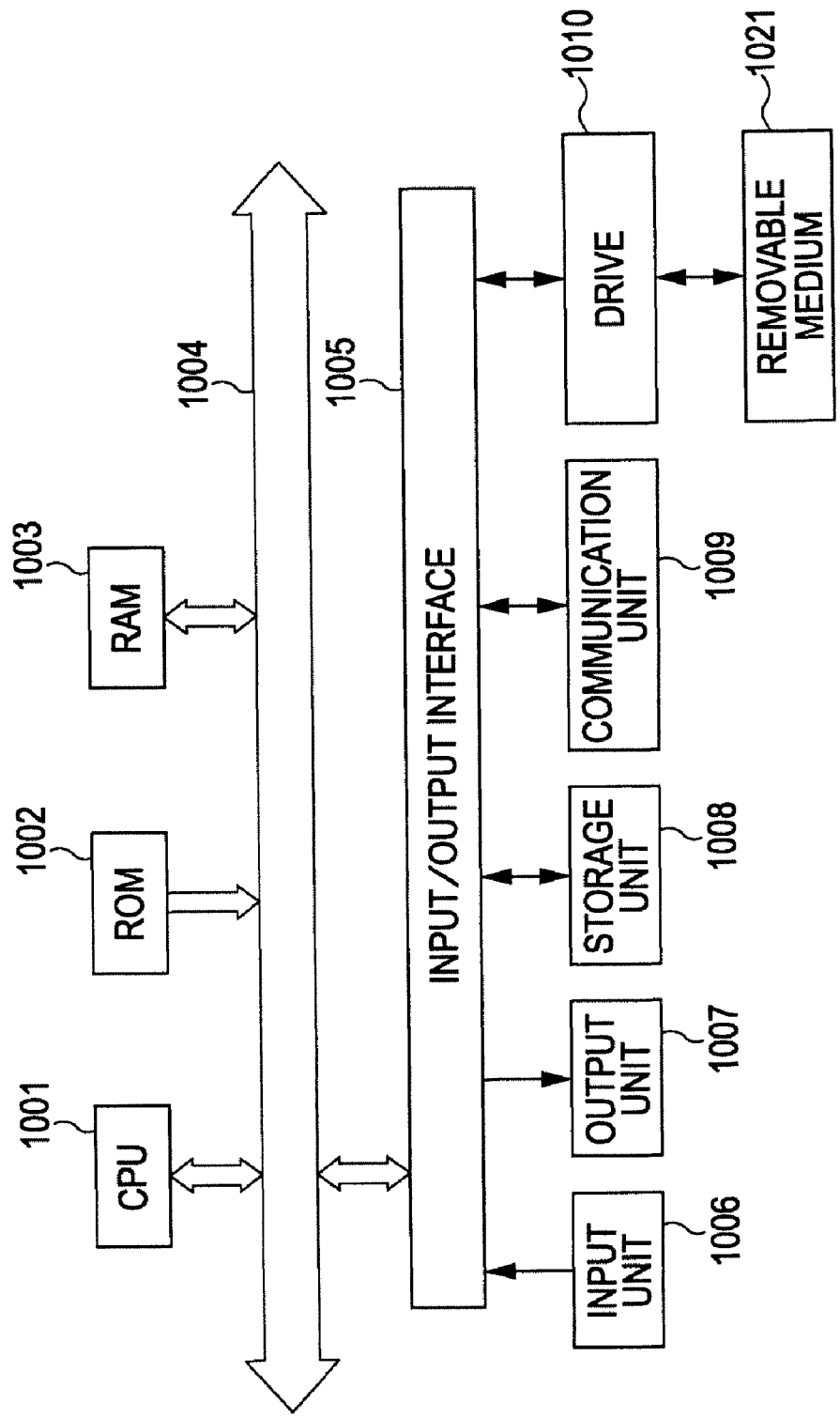
FIG. 27 is a diagram of a personal computer.

FIG. 27 shows an exemplary configuration of a personal computer in the case where the electrical internal structure of the image processing apparatus 13 shown in FIGS. 3, 13, 15, 18, 21, and 24 is realized by software. A central processing unit (CPU) 1001 of the personal computer controls the overall operation of the personal computer. The CPU 1001 executes a program stored in a read only memory (ROM) 1002 when a user gives an instruction to the CPU 1001 using an input unit 1006 including a keyboard and a mouse via a bus 1004 and an input/output interface 1005. The CPU 1001 loads a program that is read from a removable medium 1021 including a magnetic disk, an optical disk, a magneto-optical disk, or a semiconductor memory connected to a drive 1010 and that is installed in a storage unit 1008 into a random access memory (RAM) 1003 and executes the program. As a result, the functions of the image processing apparatus 13 shown in FIGS. 3, 13, 15, 18, 21, and 24 are realized by the software. Furthermore, the CPU 1001 controls a communication unit 1009 to communicate with the outside and to exchange data.

A recording medium having the program recorded therein not only includes, as shown in FIG. 27, the removable medium 1021, which is a package medium including a magnetic disk (including a flexible disk), an optical disk (including a compact disc-read only memory (CD-ROM) and a digital versatile disc (DVD)), a magneto-optical disk (including a mini-disc (MD)), or a semiconductor memory, which records the program and is distributed in order to provide the program to a user independent of the computer, but also includes the ROM 1002 and the hard disk included in the storage unit 1008 which record the program and which are built in the computer to be provided to the user.

In the specification, the steps forming the program recorded in the recording medium are not necessarily performed in accordance with the time sequence following the order described above. Alternatively, the steps may be performed in parallel or individually.

It should be understood by those skilled in the art that various modifications, combinations, sub-combinations, and alterations may occur depending on design requirements and other factors insofar as they are within the scope of the appended claims or the equivalents thereof.

What is claimed is:

1. An image processing apparatus comprising:
feature-value extracting means for extracting a feature value from an image;
setting means for setting setting information for applying a process to the image;
recording means for recording the setting information in association with the feature value of the image in a data recording medium; and
operation means for performing an operation specifying the process to be applied to the image,
wherein the setting means sets the setting information for applying the process to the image on the basis of details of the operation of the operation means, the recording means records the details of the operation in association with the feature value of the image in the data recording medium, and when the details of the operation of the operation means specifying the process to be applied to the image are to specify a relative process with respect to the immediately preceding process applied to the image, the recording means records, in association with the feature value of the image, the details of the operation and setting information based on the immediately preceding process in the data recording medium.

2. The image processing apparatus according to claim 1, wherein the feature-value extracting means extracts a sum of pixel values of pixels within a predetermined region included in the image as the feature value.

3. The image processing apparatus according to claim 1, wherein the recording means records the feature value of the image at a first address in the data recording medium and the setting information at a second address associated with the first address.

4. The image processing apparatus according to claim 1, wherein the recording means records a table in which the feature value of the image is associated with the setting information in the data recording medium.

5. An image processing method comprising:
extracting a feature value from an image;
setting setting information for applying a process to the image;
recording the setting information in association with the feature value of the image in a data recording medium; and
performing, by a processor, an operation specifying the process to be applied to the image,
wherein the setting sets the setting information for applying the process to the image on the basis of details of the operation of the operation, the recording records the details of the operation in association with the feature value of the image in the data recording medium, and when the details of the operation specifying the process to be applied to the image are to specify a relative process with respect to the immediately preceding process applied to the image, the recording records, in association with the feature value of the image, the details of the operation and setting information based on the immediately preceding process in the data recording medium.

6. A non-transitory computer readable medium having a computer-readable program recorded therein, the program comprising:
extracting a feature value from an image;
setting setting information for applying a process to the image;
recording the setting information in association with the feature value of the image in a data recording medium; and
performing an operation specifying the process to be applied to the image,
wherein the setting sets the setting information for applying the process to the image on the basis of details of the operation of the operation, the recording records the details of the operation in association with the feature value of the image in the data recording medium, and when the details of the operation specifying the process to be applied to the image are to specify a relative process with respect to the immediately preceding process applied to the image, the recording records, in association with the feature value of the image, the details of the operation and setting information based on the immediately preceding process in the data recording medium.

7. A data recording medium comprising a data structure in which setting information for applying a process to an image is recorded in association with a feature value of the image, the data recording medium configured to have the image recorded thereon in association with the feature value the image by an image processing apparatus including
a feature value extractor configured to extract the feature value from the image;
a setting unit configured to set setting information for applying a process to the image;
a recorder configured to record the setting information in association with the feature value of the image in the data recording medium; and
an operation processor configured to perform an operation specifying the process to be applied to the image,
wherein the setting unit sets the setting information for applying the process to the image on the basis of details of the operation of the operation processor, the recorder records the details of the operation in association with the feature value of the image in the data recording medium, and when the details of the operation of the operation processor specifying the process to be applied to the image are to specify a relative process with respect to the immediately preceding process applied to the image, the recorder records, in association with the feature value of the image, the details of the operation and setting information based on the immediately preceding process in the data recording medium.

8. The data recording medium according to claim 7, wherein the data recording medium is a removable medium.

9. An image processing apparatus comprising:
playback-position feature-value extracting means for extracting a feature value at a playback position as a playback-position feature value from an image at the playback position;
synchronizing means for synchronizing, with the playback-position feature value, a feature value in a data recording medium in which setting information for applying a process to the image is recorded in association with the feature value of the image;
reading means for reading, when the feature value in the data recording medium is synchronized with the playback-position feature value by the synchronizing means, setting information recorded in association with the synchronized playback-position feature value from the data recording medium; and
reflecting means for reflecting the process applied to the image at the playback position on the basis of the setting information read by the reading means.

10. The image processing apparatus according to claim 9, wherein the synchronizing means includes search-position feature-value extracting means for sequentially extracting, from the data recording medium in which the setting information for applying the process to the image is recorded in association with the feature value of the image, the feature value as a search-position feature value, and comparing means for sequentially comparing the playback-position feature value with the search-position feature value, wherein, when a comparison result shows that the playback-position feature value matches the search-position feature value, it is regarded that the feature value in the data recording medium in which the setting information for applying the process to the image is recorded in association with the feature value of the image is synchronized with the playback-position feature value.

11. An image processing method comprising:
extracting a feature value at a playback position as a playback-position feature value from an image at the playback position;
synchronizing, with the playback-position feature value, a feature value in a data recording medium in which setting information for applying a process to the image is recorded in association with the feature value of the image;
reading, when the feature value in the data recording medium is synchronized with the playback-position feature value, setting information recorded in association with the synchronized playback-position feature value from the data recording medium; and
reflecting, by a processor, the process applied to the image at the playback position on the basis of the read setting information.

12. A non-transitory computer readable medium having a computer-readable program recorded therein, the program comprising:
extracting a feature value at a playback position as a playback-position feature value from an image at the playback position;
synchronizing, with the playback-position feature value, a feature value in a data recording medium in which setting information for applying a process to the image is recorded in association with the feature value of the image;
reading, when the feature value in the data recording medium is synchronized with the playback-position feature value, setting information recorded in association with the synchronized playback-position feature value from the data recording medium; and
reflecting the process applied to the image at the playback position on the basis of the read setting information.

13. An image processing apparatus comprising:
a feature value extractor configured to extract a feature value from an image;
a setting unit configured to set setting information for applying a process to the image;
a recorder configured to record the setting information in association with the feature value of the image in a data recording medium; and
operation means for performing an operation specifying the process to be applied to the image,
wherein the setting means sets the setting information for applying the process to the image on the basis of details of the operation of the operation means, the recording means records the details of the operation in association with the feature value of the image in the data recording medium, and when the details of the operation of the operation means specifying the process to be applied to the image are to specify a relative process with respect to the immediately preceding process applied to the image, the recording means records, in association with the feature value of the image, the details of the operation and setting information based on the immediately preceding process in the data recording medium.

14. An image processing apparatus comprising:
a playback-position feature-value extractor configured to extract a feature value at a playback position as a playback-position feature value from an image at the playback position;
a synchronizing unit configured to synchronize, with the playback-position feature value, a feature value in a data recording medium in which setting information for applying a process to the image is recorded in association with the feature value of the image;
a reader configured to read, when the feature value in the data recording medium is synchronized with the playback-position feature value by the synchronizing unit, setting information recorded in association with the synchronized playback-position feature value from the data recording medium; and
a reflecting unit configured to reflect the process in the image at the playback position on the basis of the setting information read by the reading means.

* * * * *